(12) United States Patent
Shirai et al.

(10) Patent No.: US 9,480,117 B2
(45) Date of Patent: Oct. 25, 2016

(54) CONTROL SYSTEM FOR CONTROLLING A LOAD VIA POWER-LINE COMMUNICATIONS

(71) Applicants: Shiro Shirai, Tachikawa (JP); Ken Sato, Koto-ku (JP); Hiroyasu Sano, Koto-ku (JP)

(72) Inventors: Shiro Shirai, Tachikawa (JP); Ken Sato, Koto-ku (JP); Hiroyasu Sano, Koto-ku (JP)

(73) Assignee: TOKYO METROPOLITAN INDUSTRIAL TECHNOLOGY RESEARCH INSTITUTE, Tokyo (JP)

( * ) Notice: Subject to any disclaimer, the term of this patent is extended or adjusted under 35 U.S.C. 154(b) by 0 days.

(21) Appl. No.: 14/354,758

(22) PCT Filed: Oct. 26, 2012

(86) PCT No.: PCT/JP2012/077719
§ 371 (c)(1),
(2) Date: Apr. 28, 2014

(87) PCT Pub. No.: WO2013/062086
PCT Pub. Date: May 2, 2013

(65) Prior Publication Data
US 2014/0320020 A1  Oct. 30, 2014

(30) Foreign Application Priority Data

Oct. 28, 2011  (JP) .................................. 2011-236695

(51) Int. Cl.
*H05B 33/08* (2006.01)
*H04B 3/54* (2006.01)
(Continued)

(52) U.S. Cl.
CPC ............. *H05B 33/0845* (2013.01); *G05F 3/04* (2013.01); *H04B 3/54* (2013.01); *H05B 33/0854* (2013.01);
(Continued)

(58) Field of Classification Search
CPC .......... H05B 33/0845; H05B 33/0854; H05B 37/0263; G05F 3/04; H04B 3/54
See application file for complete search history.

(56) References Cited

U.S. PATENT DOCUMENTS

| 4,418,333 A | * | 11/1983 | Schwarzbach ..... G05B 19/0421 340/12.29 |
| 2004/0037221 A1 | * | 2/2004 | Aisa .............................. 370/229 |

(Continued)

FOREIGN PATENT DOCUMENTS

| JP | 8 154285 | 6/1996 |
| JP | 11 45783 | 2/1999 |

(Continued)

OTHER PUBLICATIONS

International Preliminary Report on Patentability issued May 8, 2014 in PCT/JP2012/077719 filed Oct. 26, 2012 (English translation).

(Continued)

*Primary Examiner* — Tung X Le
*Assistant Examiner* — Raymond R Chai
(74) *Attorney, Agent, or Firm* — Oblon, McClelland, Maier & Neustadt, L.L.P.

(57) ABSTRACT

A control system includes a load including an operative part, and a control device for supplying AC power to the load through a power line and operating the operative part. The control device includes an interruption mechanism and a transmission mechanism. The load includes a controller. The transmission mechanism transmits a predetermined control signal to the load through the power line by blocking the power supply to the load by the interruption mechanism for a time duration shorter than a half cycle of AC output. The controller controls the operative part based on the control signal received from the control device.

11 Claims, 25 Drawing Sheets

(51) Int. Cl.
*H05B 37/02* (2006.01)
*G05F 3/04* (2006.01)

(52) U.S. Cl.
CPC ... *H05B 37/0263* (2013.01); *H04B 2203/5412* (2013.01); *H04B 2203/5458* (2013.01); *H05B 33/0815* (2013.01)

(56) References Cited

U.S. PATENT DOCUMENTS

| | | | |
|---|---|---|---|
| 2004/0164688 A1 | 8/2004 | Van Tichelen et al. | |
| 2008/0204303 A1* | 8/2008 | Kamimura | G01S 13/785 342/47 |
| 2010/0085144 A1* | 4/2010 | Aisa et al. | 340/3.1 |
| 2011/0193488 A1 | 8/2011 | Kanamori et al. | |
| 2012/0050307 A1* | 3/2012 | Mahowald et al. | 345/590 |
| 2012/0146515 A1* | 6/2012 | Chuang et al. | 315/129 |
| 2012/0280617 A1* | 11/2012 | Josefowicz et al. | 315/85 |

FOREIGN PATENT DOCUMENTS

| | | |
|---|---|---|
| JP | 2001 68275 | 3/2001 |
| JP | 2001 309464 | 11/2001 |
| JP | 2004 508796 | 3/2004 |
| JP | 2007 66739 | 3/2007 |
| JP | 2009 48807 | 3/2009 |
| JP | 2010-86835 | 4/2010 |
| JP | 2010 97919 | 4/2010 |
| JP | 2011 165394 | 8/2011 |
| WO | 03 003608 | 1/2003 |

OTHER PUBLICATIONS

Written Opinion issued Jan. 29, 2013 in PCT/JP2012/077719 filed Oct. 26, 2012 (English translation).

International Search Report Issued Jan. 29, 2013 in PCT/JP12/077719 Filed Oct. 26, 2012.

Office Action issued Jul. 26, 2016, in Japanese Patent Application No. 2013-540845.

\* cited by examiner

No. 1 : AC POWER SOURCE
No. 5 : OPERATIVE PART
No. 6 : INTERRUPTION MEANS
No. 7 : TRANSMISSION MEANS
No. 8 : DETECTION MEANS
No. 9 : DEMODULATION MEANS
No. 10: CONTROL MEANS
No. 11: DEMODULATION MEANS
No. 12: VARIATION MEANS
No. 13: TRANSMISSION MEANS

FIG. 4
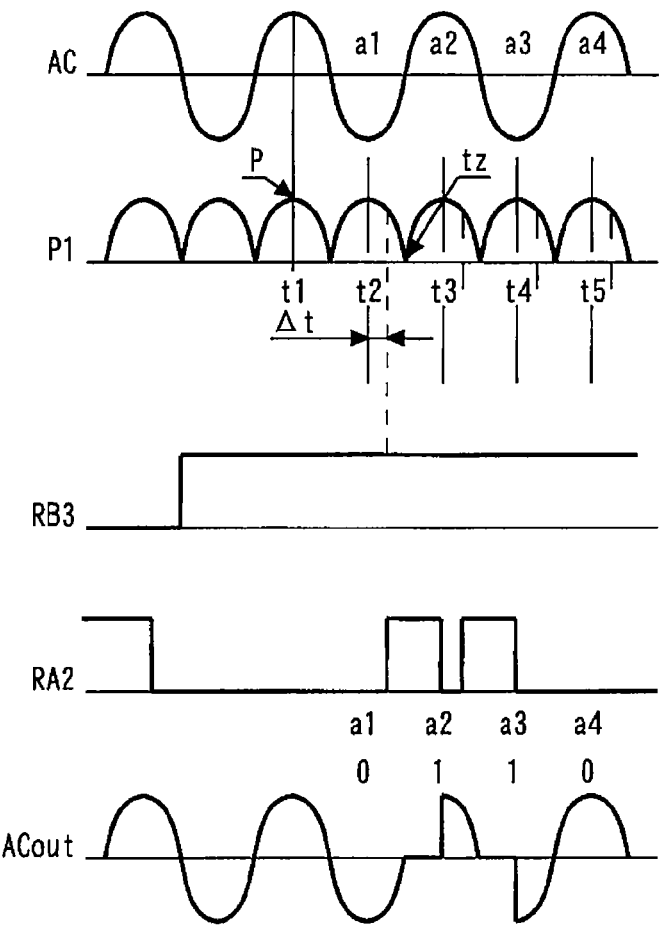
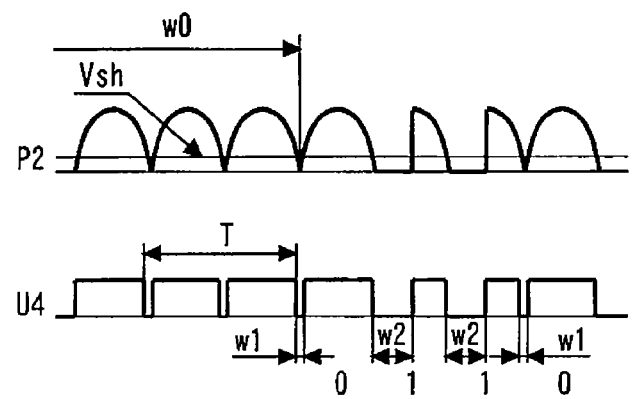

FIG. 5
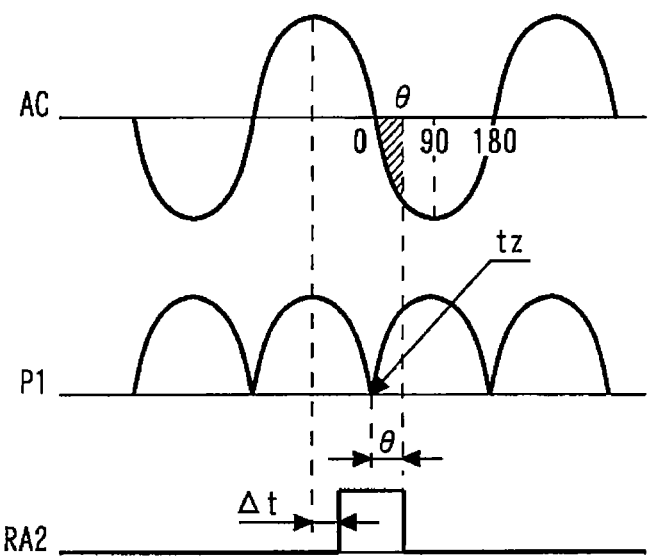
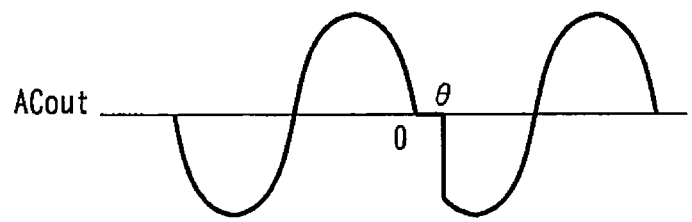
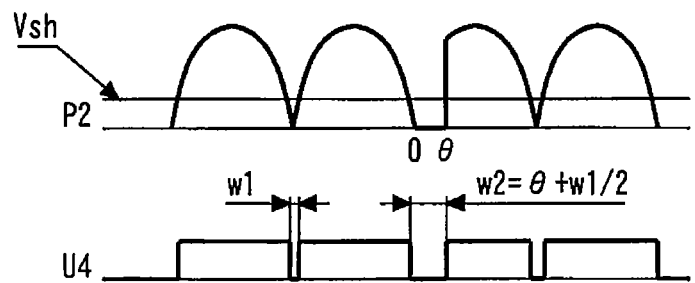

S201:DATA RECEPTION → Rx
S202:HAS DISCONNECTION OCCURRED IN LED MODULE?
S203:MAKING ALL LEDS OF OPERATION PANEL PART FLICKER

S302: MEASURE THRESHOLD FOR DISCONNECTION DETECTION
S304: HAS DISCONNECTION OCCURRED IN LED MODULE?
S316: OUTPUT ILLUMINANCE MEASUREMENT Wx

FIG. 13
(a) AT TIME OF POWER SUPPLY (SW2 ON)
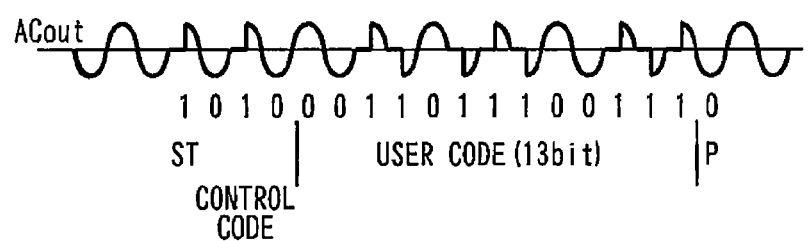
(b) ADDRESS CONTROL (ACTIVATED BY SW1 OR TIMER)
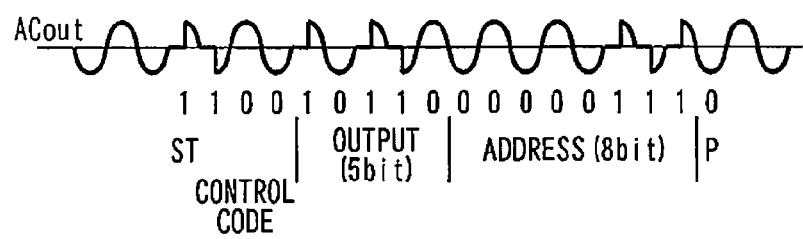
(c) ILLUMINANCE MEASUREMENT REQUEST (ACTIVATED BY SW1 OR TIMER)
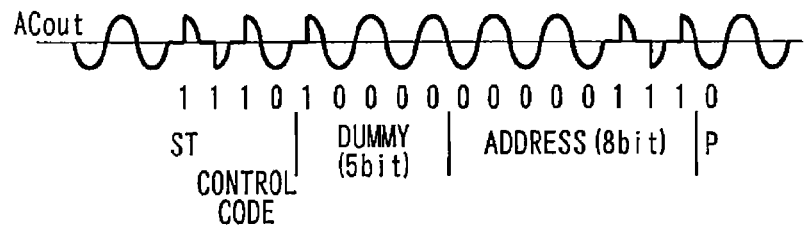

a: SUNLIGHT (NATURAL LIGHT)
b: TRANSMITTANCE OF OPTICAL FILTER (FL1)
c: RADIATION SENSITIVITY OF LIGHT RECEIVING ELEMENT
   (INFRARED SENSOR)
d: WAVELENGTH REGION OF LED LAMP

CONTROL SYSTEM FOR CONTROLLING A LOAD VIA POWER-LINE COMMUNICATIONS

TECHNICAL FIELD

This invention relates to a control system in which a control device and a load are connected through a power line.

BACKGROUND ART

An illumination lamp including an LED (light emitting diode) has many advantages, such as that there are a carbon dioxide reducing effect and an energy saving effect, a service life is long and ultraviolet rays and heat rays are hardly generated. Therefore, the illumination lamp including the LED (called simply "LED lamp", hereinafter) has been rapidly spreading to the market in recent years.

For instance, a conventional technology of the LED lamp is disclosed in the following Patent Literature 1.

CITATION LIST

Patent Literature

Patent Literature 1: Japanese Patent Laid-Open No. 2010-97919

SUMMARY OF INVENTION

Technical Problem

In Patent Literature 1, a configuration for controlling the LED lamp is not disclosed. Conventionally, for instance, in the case of controlling the LED lamp, it is needed to connect a predetermined control device and the LED lamp by a lamp line (power line) and separately connect a signal line for transmitting signals for control between the control device and the LED lamp. Therefore, there are problems that a control system is made complicated and becomes expensive.

Such problems are generated not only in the control system including the LED lamp. For instance, even when a control system for controlling loads of home electric appliances or the like is constructed, the similar problems occur.

This invention has been made in order to solve the above-mentioned problems. An object of this invention is to provide a control system capable of transmitting a desired control signal from a control device to a load by a simple and inexpensive configuration.

Solution to Problem

The control system according to the present invention a load including an operative part, and a control device for supplying AC power to the load through a power line and operating the operative part. The control device comprises interruption means for interrupting power supply to the load, and first transmission means for transmitting a control signal to the load through the power line by blocking the power supply to the load by the interruption means for a time duration shorter than a half cycle of AC output. The load comprises control means for controlling the operative part based on the control signal received from the control device.

Also, the control system according to the present invention comprises an LED lamp including an LED element, and a control device for supplying AC power to the LED lamp through a power line and making the LED element emit light. The control device comprises interruption means for interrupting power supply to the LED lamp, and first transmission means for transmitting a control signal to the LED lamp through the power line by blocking the power supply to the LED lamp by the interruption means for a time duration shorter than a half cycle of AC output. The LED lamp comprises control means for controlling illuminance of the LED element based on the control signal received from the control device.

Moreover, the control system according to the present invention comprises an LED lamp including an LED element, and a control device for supplying AC power to the LED lamp through a power line and making the LED element emit light. The control device comprises interruption means for interrupting power supply to the LED lamp, storage means for storing information on change points and information on inclination of a straight line between the change points of a first line graph indicating a sunrise time for a date, and information on change points and information on inclination of a straight line between the change points of a second line graph indicating a sunset time for the date, time calculation means for calculating the sunrise time and the sunset time of a specific date based on the information stored in the storage means, and first transmission means for transmitting a control signal to the LED lamp through the power line, based on the sunrise time and the sunset time calculated by the time calculation means, by blocking the power supply to the LED lamp for a predetermined time duration by the interruption means. The LED lamp comprises control means for controlling illuminance of the LED element based on the control signal received from the control device.

Advantageous Effects of Invention

According to this invention, in a control system in which a control device and a load are connected through a power line, a desired control signal can be transmitted from the control device to the load by a simple and inexpensive configuration.

BRIEF DESCRIPTION OF DRAWINGS

FIG. 4 is a time chart for the time of modulation and demodulation in a control device and an LED lamp.

FIG. 5 is a time chart for the time of modulation and demodulation in the control device and the LED lamp.

FIG. 11 is a diagram for describing an operation when setting the address code or the like.

FIG. 13 is a diagram illustrating an example of a control signal transmitted from the control device to the LED lamp.

DESCRIPTION OF EMBODIMENTS

The present invention will be described in detail with reference to the attached drawings. In the respective drawings, the same signs are attached to the same or equivalent parts. Redundant descriptions thereof are appropriately simplified or omitted.

First Embodiment

Figure 1:
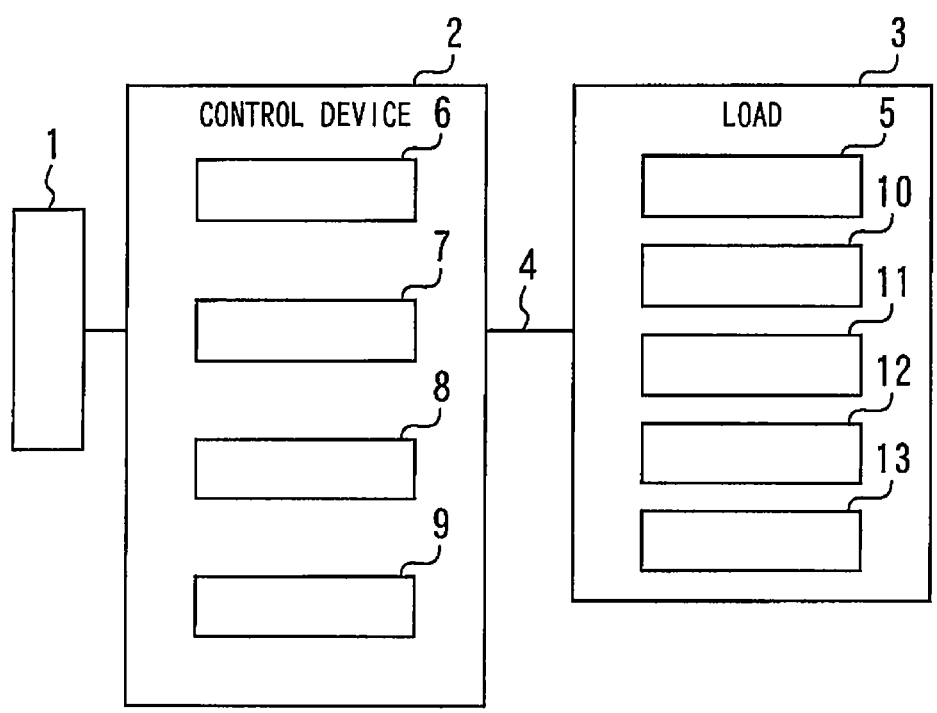
FIG. 1 is a diagram illustrating a configuration of a control system in a first embodiment according to the present invention.

FIG. 1 is a diagram illustrating a configuration of a control system in a first embodiment according to the present invention.

In FIG. 1, reference numeral 1 denotes an AC power source, reference numeral 2 denotes a control device, and reference numeral 3 denotes a load. The control device 2 and the load 3 are connected by a power line 4. The control device 2 is connected to the AC power source 1, and supplies AC power to the load 3 through the power line 4. The load 3 includes an operative part 5 for performing a predetermined operation. In the load 3, by the supply of the AC power from the control device 2, the operative part 5 performs the predetermined operation.

The operation of the operative part 5 may be accompanied by displacement of a component like a motor or may not be accompanied by the displacement like an LED element described later. The operations of the operative part 5 not accompanied by the displacement are, for instance, light emission, heat generation and sound generation, etc.

The present control system has a function of transmitting a control signal for controlling the operative part 5 from the control device 2 to the load 3 through the power line 4. In the load 3, when the control signal is received from the control device 2, the operative part 5 is appropriately controlled on the basis of the received control signal. Also, the control system has a function of transmitting a predetermined information signal from the load 3 to the control device 2 through the power line 4. When the information signal is received from the load 3, the control device 2 transmits the control signal according to contents of the information signal to the load 3. Between the control device 2 and the load 3, there is no exclusive line for transmitting and receiving the control signal and the information signal.

In order to realize such a function, the control device 2 includes interruption means 6, transmission means 7, detection means 8, and demodulation means 9. Also, the load 3 includes, in addition to the operative part 5, control means 10, demodulation means 11, variation means 12, and transmission means 13.

The interruption means 6 interrupts power supply to the load 3.

The transmission means 7 has a function of transmitting the control signal to the load 3. For instance, at normal time, the control device 2 supplies power to the load 3 through the interruption means 6 by conducting the interruption means 6. Also, when operating the stopped operative part 5 or changing the operation of the operative part 5, the control device 2 transmits the control signal to the load 3 through the power line 4 by interrupting the power supply to the load 3 according to a predetermined rule by the interruption means 6.

The rule for interrupting the power supply to the load 3 is determined beforehand. For instance, the transmission means 7 transmits the control signal to the load 3 through the power line 4 by appropriately blocking the power supply to the load 3 by the interruption means 6 with a half cycle of AC output as a unit.

For a period of blocking the power supply to the load 3 in order to transmit the control signal, a time duration longer than the half cycle of the AC output may be a unit if possible. However, when the time duration of blocking the power supply to the load 3 is set short, an information amount of the control signal can be increased.

Therefore, it is desirable that the transmission means 7 transmits the control signal by blocking the power supply to the power 3 for a time duration shorter than the half cycle of the AC output by the interruption means 6. In that case, the transmission means 7 blocks the supply of the AC power to the load 3 at a zero-cross point of the AC output by appropriately controlling the interruption means 6, for instance. Also, the transmission means 7 restarts the supply of the AC power to the load 3 at predetermined timing between the zero-cross point at which the power supply is blocked and the next zero-cross point.

The demodulation means 11 of the load 3 demodulates the control signal transmitted by the control device 2 (specifically, the transmission means 7). The demodulation means 11 demodulates the control signal on the basis of an interruption pattern of the power supply to the load 3. For instance, the demodulation means 11 monitors temporal change of an input AC voltage (the AC voltage supplied from the control device 2 through the power line 4), and demodulates the control signal on the basis of the change.

The control means 10 controls the operation of the operative part 5. The control means 10 controls the operative part 5 so that the operative part 5 is operated according to contents of the control signal on the basis of a result of demodulation by the demodulation means 11.

The detection means 8 and the demodulation means 9, and the variation means 12 and the transmission means 13 are provided in order to transmit the information signal from the load 3 and receive (demodulate) the information signal in the control device 2.

The variation means 12 varies a load current in the load 3.

The transmission means 13 has a function of transmitting the information signal to the control device 2. When it is needed to transmit some information to the control device 2, the transmission means 13 transmits the information signal through the power line 4 to the control device 2 by generating a pulse-like current variation at an interval according to a predetermined rule by the variation means 12. The transmission means 13 sets the interval (pulse interval) of a current which changes into a pulse shape according to the contents of the information to be transmitted by controlling the variation means 12. A relationship between the contents of the information to be transmitted and the pulse interval is registered beforehand in the load 3.

The detection means 8 of the control device 2 detects change of a supply current to the load 3.

The demodulation means 9 demodulates the information signal transmitted by the load 3 (specifically, the transmission means 13). The demodulation means 9 demodulates the information signal on the basis of the change of the supply current to the load 3. For instance, the demodulation means 9 measures the interval (pulse interval) of the current variation generated in the pulse shape on the basis of a result of detection by the detection means 8. Then, the demodulation means 9 demodulates the information signal on the basis of the measured pulse interval. The relationship between the contents of the information signal and the pulse interval is registered beforehand also in the control device 2.

When the information signal is received from the load 3, the control device 2 generates the control signal of the contents according to the information signal, for instance. That is, the transmission means 7 controls interruption of the power supply by the interruption means 6 on the basis of a result of demodulation by the demodulation means 9, and transmits the control signal of the contents according to the information signal received from the load 3 to the load 3. Thus, for instance, when the information signal corresponding to a present situation is transmitted from the load 3 to the control device 2, the control device 2 generates the control signal so as to match the operation of the operative part 5 with the present situation and transmits the control signal to the load 3.

Next, a concrete example of the control system including a basic configuration illustrated in FIG. 1 will be described with reference to FIG. 2 to FIG. 15.

The control system is applicable to various kinds of industrial and household systems if it is the system in which the control device 2 and the load 3 are connected through the power line 4. For instance, when a home electric appliance is provided as the load 3, by transmitting the control signal from the control device 2 through the power line 4, the home electric appliance can be controlled (remotely operated, for instance) without the need of a signal line exclusive for control. In the following, as one example of the control system, the case of adopting an LED (light emitting diode) lamp for the load 3 will be described.

Figure 2:
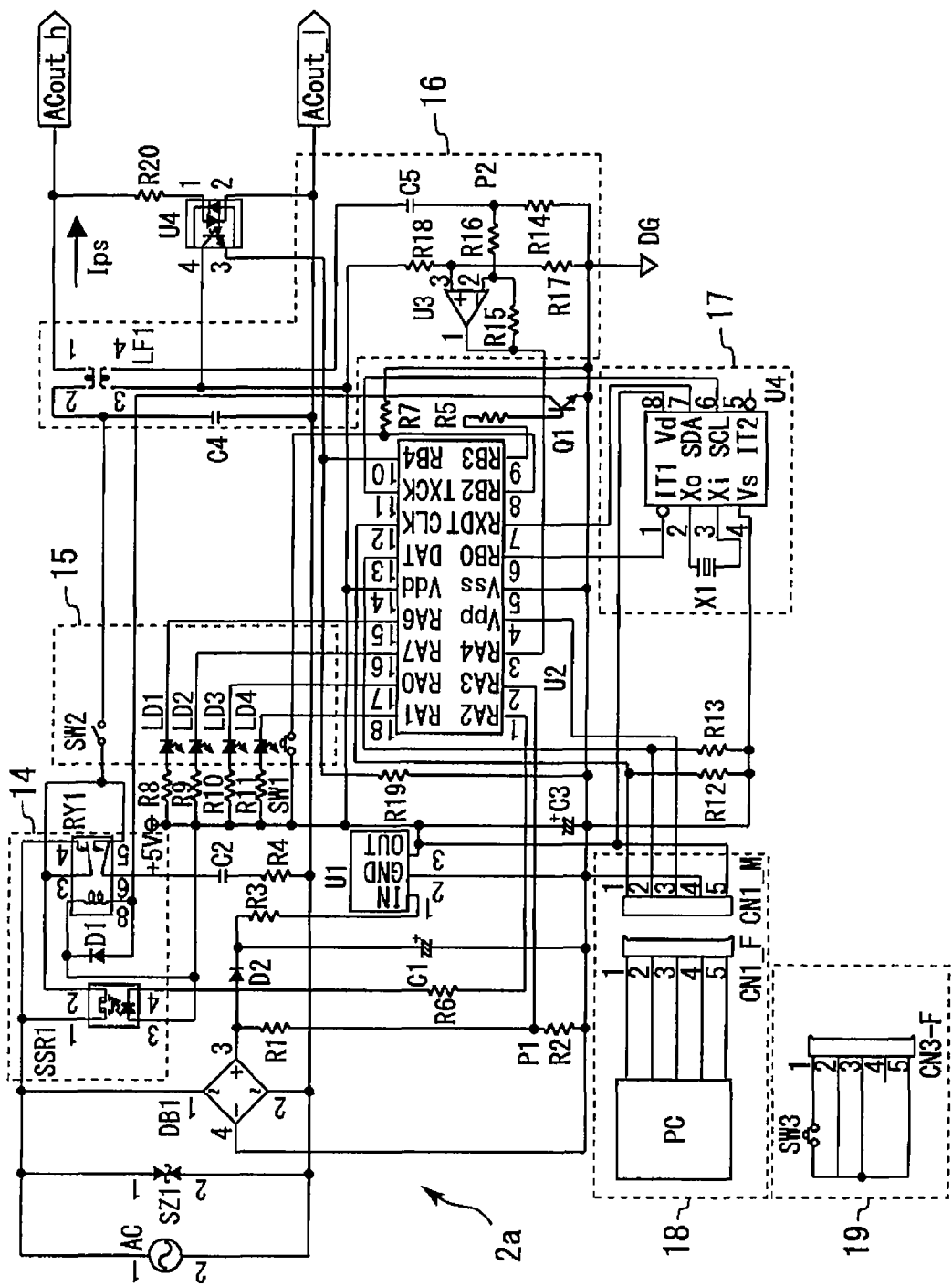
FIG. 2 is a diagram illustrating a concrete configuration of the control system in the first embodiment according to the present invention.
Figure 3:
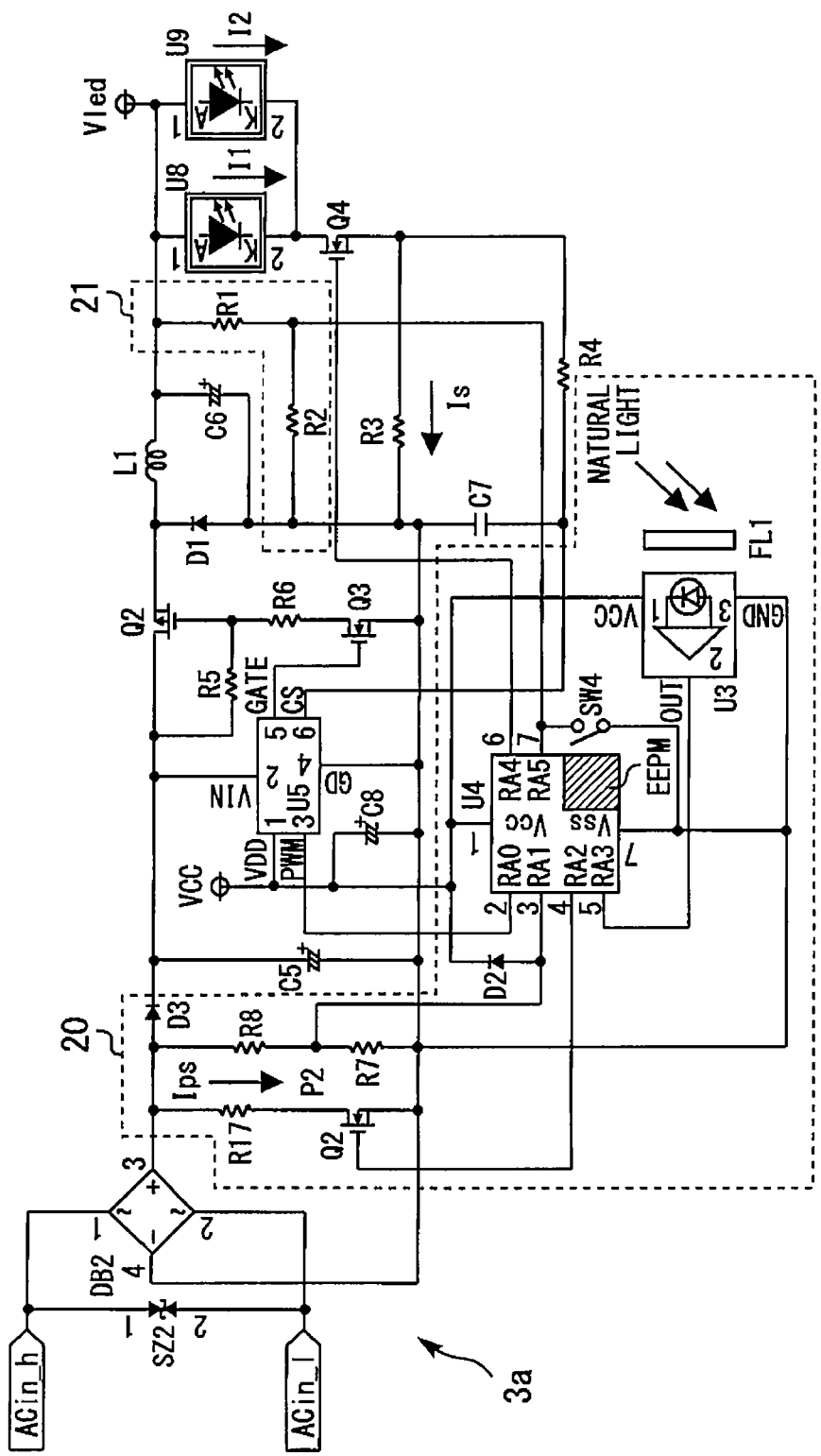
FIG. 3 is a diagram illustrating a concrete configuration of the control system in the first embodiment according to the present invention.

FIG. 2 and FIG. 3 are diagrams illustrating a concrete configuration of the control system in the first embodiment according to the present invention. FIG. 3 illustrates a circuit diagram of an LED lamp 3a adopted as the load 3. FIG. 2 illustrates a circuit diagram of a control device 2a which supplies the AC power to the LED lamp 3a through the power line 4 and controls the LED lamp 3a.

In FIG. 2, reference character AC denotes an AC power source. The control device 2a is supplied with power from the AC power source AC. The control device 2a includes a power supply part 14, an operation panel part 15, a pulse detection part 16, a calendar part 17, a program input part 18, and an address setting key 19. Reference character U2 denotes a microprocessor for controlling various kinds of operations of the control device 2a. Reference characters ACout_h and ACout_1 denote AC output terminals of the control device 2a.

In FIG. 3, reference characters ACin_h and ACin_1 denote AC input terminals of the LED lamp 3a. The LED lamp 3a includes a control part 20 and a resistor part 21. Reference characters U8 and U9 denote LED modules for illumination. The LED modules U8 and U9 include an LED element, respectively. Reference character I1 denotes a current flowing through the LED module U8, and reference character I2 denotes a current flowing through the LED module U9. The total of the currents I1 and I2 is $I_S$ ($I_S$=I1+I2). Also, reference character Q4 denotes a field effect transistor (FET), and reference character U5 denotes an integrated circuit (IC) for a switching power source.

The power supply part 14 of the control device 2a configures a main part for supplying the power to the LED lamp 3a. A function of the interruption means 6 is realized by the power supply part 14. That is, in the control device 2a, the power supply to the LED lamp 3a is interrupted by the power supply part 14.

Also, a function of the transmission means 7 is realized by one function of the microprocessor U2. That is, the microprocessor U2 transmits the control signal to the LED lamp 3a through the power line 4 by interrupting the power supply to the LED lamp 3a according to a prescribed rule by the power supply part 14. For instance, the microprocessor U2 transmits the control signal by blocking the power supply to the LED lamp 3a for a time duration shorter than a half cycle of the AC output by the power supply part 14.

The power supply part 14 includes a solid state relay SSR1 and a mechanical relay RY1 that are connected in parallel, for instance.

Output terminals 1 and 2 of the solid state relay SSR1 and contacts 3 and 4 of the mechanical relay RY1 are connected in parallel between the AC power source AC and the AC output terminal ACout_h. Terminals of the microprocessor U2 which control them are RA2 and RB3. When not transmitting the control signal to the LED lamp 3a, I/O output of the microprocessor U2 is RA2="H" and RB 3="L". In that state, the current does not flow to an internal LED of the solid state relay SSR1 and the contacts 3-4 of the mechanical relay RY1 are closed.

In this state, when a switch SW2 of the operation panel part 15 is turned on and the power is supplied to the LED lamp 3a, a load current does not flow to the solid state relay SSR1, and the current flows between the contacts 3-4 of the mechanical relay RY1. That is, in the case of supplying the power to the LED lamp 3a without being accompanied by the transmission of the control signal (for instance, in the case of supplying the power only to light the LED lamp 3a), the mechanical relay RY1 is not operated, the slid state relay SSR1 is not conducted, and the power is supplied to the LED lamp 3a through the contacts 3-4 of the mechanical relay RY1. Output ACout of the control device 2a at this time coincides with output of the AC power source AC (ACout=AC).

When transmitting the control signal to the LED lamp 3a, the microprocessor U2 first turns the I/O output to RA2="L". Thus, the solid state relay SSR1 is in a conducted state. After the solid state relay SSR1 is conducted, the microprocessor U2 turns the I/O output to RB3="H". Thus, the mechanical relay RY1 is operated and the contacts 3-4 of the mechanical relay RY1 are opened. In this state, the power is supplied to the LED lamp 3a through the solid state relay SSR1. That is, the control device 2a is turned to a state capable of transmitting the control signal to the LED lamp 3a.

In the microprocessor U2, after opening the contacts 3-4 of the mechanical relay RY1 and attaining the state capable of transmitting the control signal, the opening/closing of the solid state relay SSR1 is appropriately controlled (the power supply to the LED lamp 3a is interrupted by the solid state relay SSR1), and the control signal is transmitted to the LED lamp 3a.

A transmission method of the control signal will be described later.

When the transmission of the control signal to the LED lamp 3a is completed, the microprocessor U2 turns the I/O output to RB3="L", and closes the contacts 3-4 of the mechanical relay RY1. Thereafter, the microprocessor U2 is turned into RA2="H", makes the solid state relay SSR1 non-conductive, and supplies the power to the LED lamp 3a through the contacts 3-4 of the mechanical relay RY1.

In the power supply part 14 including the above-described circuit configuration, the current flows to the internal LED of the solid state relay SSR1 only when transmitting the control signal to the LED lamp 3a. Thus, degradation of the internal LED of the solid state relay SSR1 can be prevented, and a service life of the internal LED can be prolonged.

As one example, the case of adopting the LED lamp 3a as the load 3 as in this embodiment and utilizing the control signal for illuminance control of the LED lamp 3a as described later is considered. In that case, a time period of transmitting the control signal to the LED lamp 3a is limited to an extremely short time period with respect to a time period of supplying the power to the LED lamp 3a. For instance, the time period of transmitting the control signal in order to control the illuminance of the LED lamp 3a is about 200 ms/time, and the number of times is about 10 times/day.

Thus, even when a large current flows to the LED lamp 3a, heat generation from the solid state relay SSR1 can be suppressed, and degradation of the internal LED can be prevented. That is, the solid state relay SSR1 can be used in a highly reliable state over a long period of time. Furthermore, since the solid state relay SSR1 can also be miniaturized, the configuration of the control device 2a can be simplified, and the control device 2a can be provided at a low cost.

In the meantime, the control part 20 of the LED lamp 3a has various functions needed when controlling the LED lamp 3a. The control part 20 has, in addition to a basic function of lighting the LED modules U8 and U9 (making the LED elements emit light), for instance, a function of controlling the illuminance of (the LED elements inside) the LED modules U8 and U9 (a function of the control means 10), a function of demodulating the control signal transmitted from the control device 2a (a function of the demodulation means 11), and a function of transmitting the predetermined information signal to the control device 2a (a function of the transmission means 13), etc.

The control part 20 includes a field effect transistor (FET) Q2, an infrared light receiving element U3, an optical filter FL1, a diode D2 for clamping, a microprocessor U4, resistors R17, R7 and R8, and a switch SW4.

Details of the respective functions that the control part 20 has will be described later.

Next, also with reference to FIG. 4 and FIG. 5, a method of transmitting the control signal composed of binary codes (binary signals) from the control device 2a to the LED lamp 3a and receiving the control signal in the LED lamp 3a will be described. FIG. 4 and FIG. 5 are time charts for the time of modulation and demodulation in the control device and the LED lamp.

In FIG. 4, for the control device 2a, waveforms at the AC power source AC, a point P1, the terminals RA2 and RB3 of the microprocessor U2, and the output terminal ACout are illustrated. Also, for the LED lamp 3a, a waveform at a point P2, and a waveform recognized inside the microprocessor U4 are illustrated.

The control device 2a includes a diode bridge DB1 for rectifying an AC output waveform of the AC power source AC to a DC waveform as illustrated in FIG. 2. The diode bridge DB1 is a full-wave rectifier circuit. Between a positive terminal and a negative terminal of the diode bridge DB1, voltage dividing resistors R1 and R2 are connected in series. The point P1 is a connection point of the voltage dividing resistors R1 and R2.

The LED lamp 3a includes a diode bridge DB2 for rectifying an AC input waveform from the control device 2a to the DC waveform as illustrated in FIG. 3. The diode bridge DB2 is a full-wave rectifier circuit. Between a positive terminal and a negative terminal of the diode bridge DB2, voltage dividing resistors R8 and R7 are connected in series. The point P2 is a connection point of the voltage dividing resistors R8 and R7.

In FIG. 4, reference characters a1 to a4 denote bit sections of transmission data. Here, a half-wave length (half cycle of AC output) is defined as 1 bit. Also, definition of the modulation is set as follows. When it is the output waveform of the AC power source AC as-is, it is defined as "0", which is one of the binary codes. When a part corresponding to a section from 0 to a peak point P of the waveform after full-wave rectification is cut off and is 0 V, it is defined as "1", which is the other one of the binary codes.

Hereinafter, with the case of transmitting data "0110" (b0="0", b1="1", b2="1", and b3="0") taken as an example, respective operations of the control device 2a and the LED lamp 3a will be specifically described.

As described above, when transmitting the control signal to the LED lamp 3a, in the microprocessor U2, RA2="L" is attained first immediately before transmitting the control signal, and RB3="H" is attained thereafter. Reference character RA3 in the microprocessor U2 denotes an input terminal of an AD converter. The microprocessor U2 attains RB3="H", and then monitors a voltage at the point P1 on the basis of the input of the terminal RA3. The microprocessor U2 prepares to transmit the data b0="0" in the first bit section a1 at the time t1 at which the peak point P of the voltage at the point P1 is detected. When transmitting "0" as the binary signal, it is needed to output the output waveform of the AC power source AC as-is to the LED lamp 3a. Therefore, the microprocessor U2 retains the I/O output as RA2="L" even after the time t1.

The next data b1="1" is transmitted in the bit section a2 immediately after the bit section a1. The microprocessor U2 prepares to transmit the data b1="1" when the peak point P of the voltage at the point P1 is detected at the time t2 after the time t1. Specifically, the microprocessor U2 attains RA2="H" at the time t2+Δt after the lapse of Δt from the time t2. The time t2+Δt is the time before the voltage at the point P1 becomes 0 after the time t2. By attaining RA2="H", for the solid state relay SSR1, the current of the internal LED is cut off. The solid state relay SSR1 is cut off at the time tz at which the voltage at the point P1 becomes 0 immediately after the time t2. Therefore, the output ACout of the control device 2a becomes 0 at the time tz.

The microprocessor U2 attains RA2="L" when the peak point P of the voltage at the point P1 is detected at the time t3 next after the time t2. Thus, the solid state relay SSR1 is turned to the conducted state, and the output ACout of the control device 2a coincides with the output of the AC power source AC (ACout=AC).

When transmitting the data b2="1" and b3="0", the similar control is performed.

By the above-described operations, modulated codes as indicated at ACout in FIG. 4 are transmitted from the control device 2a to the LED lamp 3a.

In the LED lamp 3a, by the control part 20, the control signal transmitted by the control device 2a is demodulated. For instance, the control part 20 (microprocessor U4 or the like) demodulates the control signal on the basis of the temporal change of the AC voltage supplied from the control device 2a.

A voltage waveform at the point P2 when the LED lamp 3a receives the control signal (data "0110") from the control device 2a is as indicated at P2 in FIG. 4. The point P2 configures a reception point of the control signal and is connected to the terminal RA1 of the microprocessor U4. When a threshold voltage of the terminal RA1 is defined as Vsh, in the inside of the microprocessor U4, the voltage at the point P2 received at the RA1 is recognized as the waveform as indicated at U4 in FIG. 4. That is, in the inside of the microprocessor U4, it is recognized as "H" when the voltage at the point P2 is higher than the threshold voltage Vsh, and as "L" when the voltage at the point P2 is lower than the threshold voltage Vsh.

Reference character w0 indicated in FIG. 4 denotes a section in which the control signal is not transmitted from the control device 2a to the LED lamp 3a (non-signal section). In the non-signal section, a section width of RA1="L" of the microprocessor U4 is always w1.

On the other hand, in a section in which the control signal is transmitted from the control device 2a to the LED lamp 3a (signal section), the section width of RA1="L" of the microprocessor U4 is as follows.

In the section of transmitting the data "0" (bit sections a1 and a4, in the above-described example), the section width of RA1="L" is w1, similarly to the time of the non-signal section. The section width is a width of an RA1="L" region formed between the bit section and a bit section immediately before the bit section. That is, in the bit section a4 in which the data "0" is transmitted, the RA1="L" region of the section width w1 is formed between the bit section a3 immediately before the bit section a4 and the bit section a4.

In the section of transmitting the data "1" (bit sections a2 and a3, in the above-described example), the section width of RA1="L" is w2 (>w1). The section width w2 is indicated by w2=(w1+T)/2, when a cycle of the output waveform of the AC power source AC is defined as T. For instance, in the bit section a2 in which the data "1" is transmitted, the RA1="L" region of the section width w2 is formed between the bit section a1 immediately before the bit section a2 and the bit section a2.

Therefore, by monitoring (measuring) the section width (that is, the pulse interval) of RA1="L", the microprocessor U4 can determine whether the signal received from the control device 2a is "0" or "1", and accurately perform the demodulation. A value recognized by the microprocessor U4 by the above-described demodulation method is indicated by "0110" indicated at U4 in FIG. 4.

The example indicated in FIG. 4 is the case of transmitting and receiving data with the half-wave length as 1 bit. Next, with reference to FIG. 5, the case of transmitting and receiving data by putting information of a plurality of bits on the half-wave length will be described. FIG. 5 illustrates the time chart for the time of transmitting and receiving data by a so-called phase modulation system of changing cut timing of the output waveform of the AC power source AC. In FIG. 5, reference numerals 0, 90 and 180 of an AC waveform denote phase values, and reference character θ denotes a modulation phase.

Also in the case illustrated in FIG. 5, when transmitting "0" of the binary signal, the control device 2a outputs the output waveform of the AC power source AC as-is in the bit section. Also, when transmitting "1" of the binary signal, the control device 2a forms a section to be the output ACout=0, in the first half part of the bit section by appropriately cutting off the solid state relay SSR1. The timing of cutting off the solid state relay SSR1 is similar to the case illustrated in FIG. 4.

θ is determined by counting elapsed time from the time tz at which the voltage at the point P1 becomes 0. For instance, by allocating the values of 0°, 45°, 90° and 135° to θ, the information of 2 bits can be transmitted in the half-wave length (AC half cycle). Also, for instance, by allocating the values of 0°, 30°, 60°, 90°, 120°, and 150° to θ, the information of 3 bits can be transmitted in the AC half cycle. When θ is subdivided, a communication density can be further increased.

In the LED lamp 3a, as illustrated in FIG. 5, whether the information of the bit section is "0" or "1" can be specified from the section width (pulse interval) of RA1="L" on the basis of a relational expression of θ=w2−w1/2. That is, in the LED lamp 3a, by monitoring (measuring) the section width of RA1="L" in the microprocessor U4, "0" and "1" of the control signal received from the control device 2a are determined and the demodulation is performed.

When accuracy of the cycle of a commercial AC power source and measurement accuracy of a clock frequency inside the microprocessor U2 for measuring a 0 V point at the point P1 are sufficiently high, high density communication can be performed reasonably. When transmitting the control signal by the above-described system, the AC power source AC (that is, the power supply to the load 3) has to be blocked though it is for a short time. Depending on the system to apply the control device 2 and the load 3, when the time of blocking the AC power source AC is long, the operation of the load 3 may be obstructed. In that case, by shortening the interval of the value of θ, and setting it to 10° or less, for instance, the failure can be eliminated.

Next, also with reference to FIG. 6 to FIG. 15, functions and operations of the control system utilizing the control signal will be specifically described.

Figure 6:
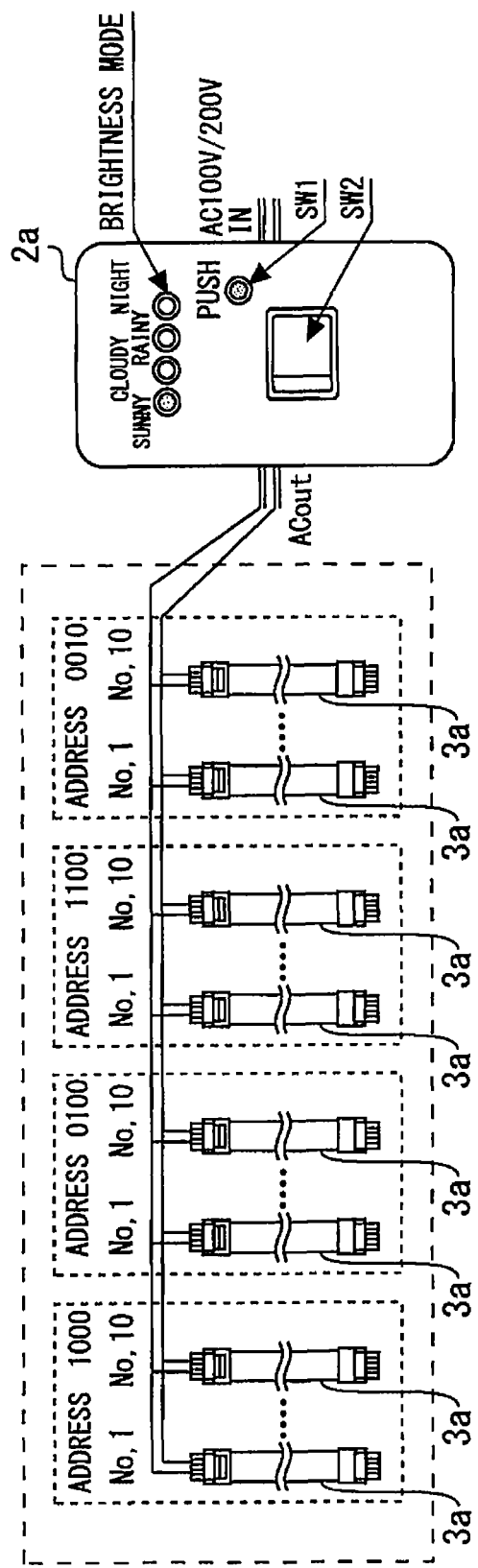
FIG. 6 is a diagram illustrating a connection example of the control device and the LED lamp.
Figure 7:
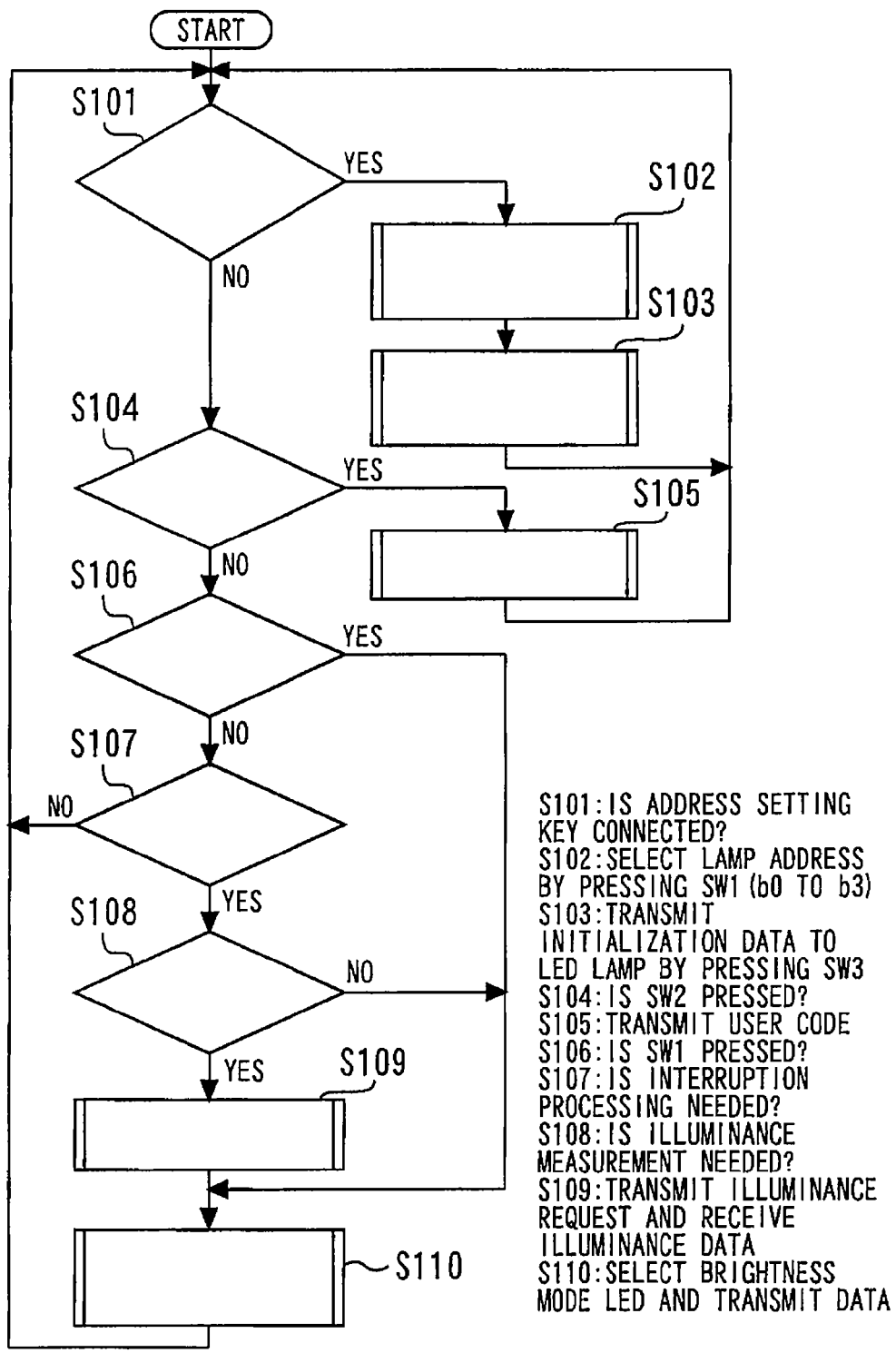
FIG. 7 is a flowchart illustrating operations of the control device in the first embodiment according to the present invention.
Figure 8:
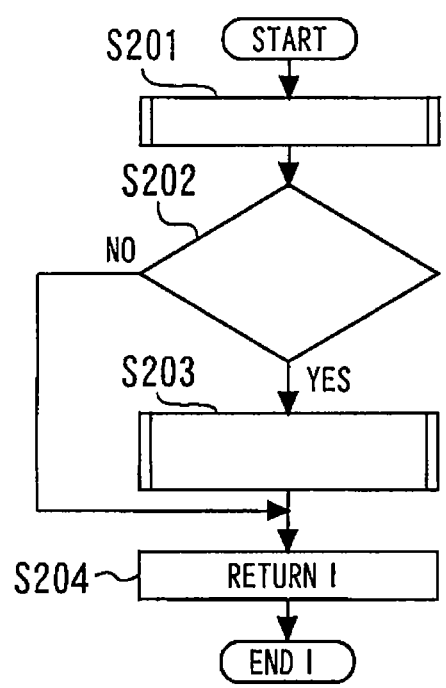
FIG. 8 is a flowchart illustrating other operations of the control device in the first embodiment according to the present invention.
Figure 9:
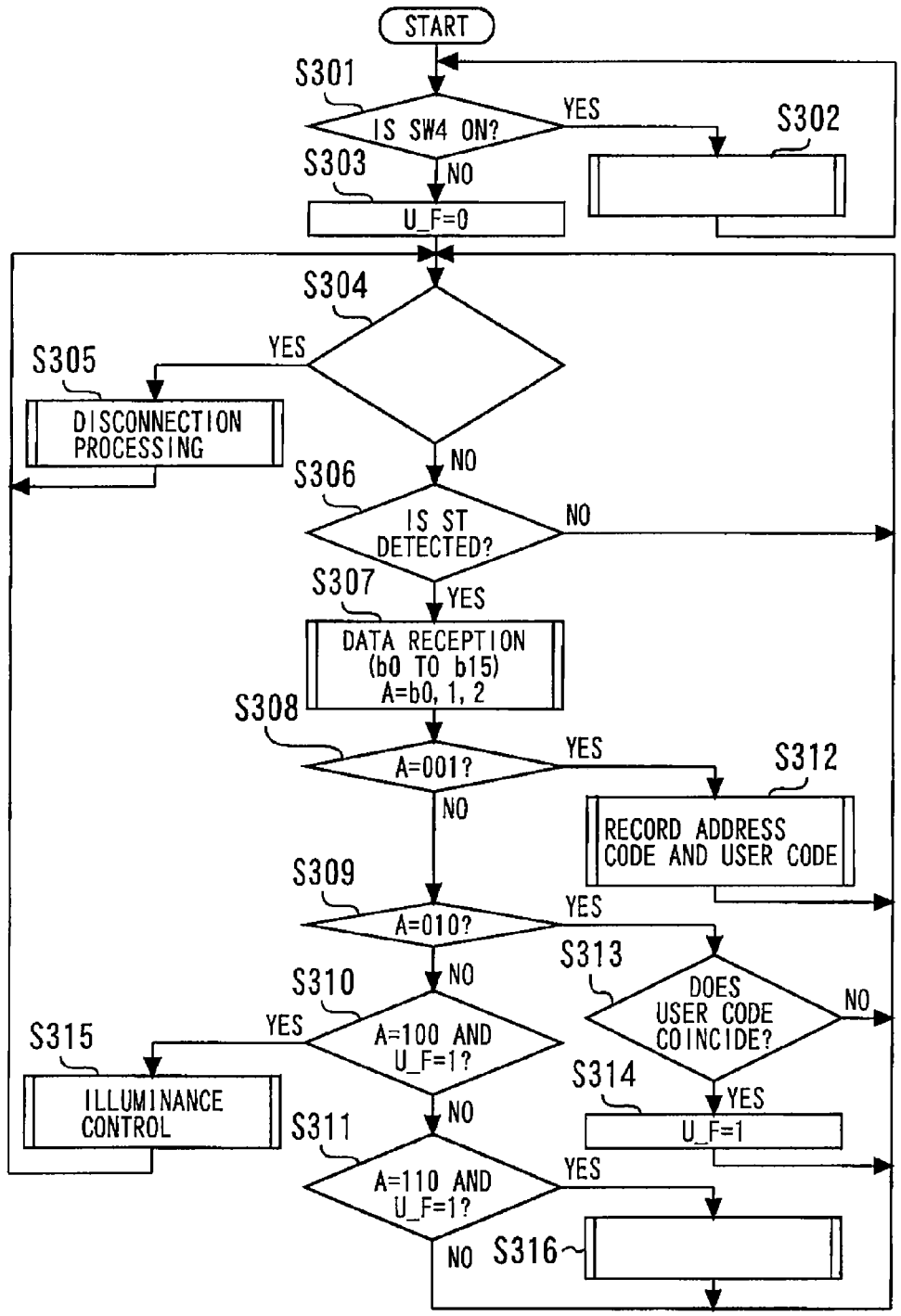
FIG. 9 is a flowchart illustrating operations of the LED lamp in the first embodiment according to the present invention.

FIG. 6 is a diagram illustrating a connection example of the control device and the LED lamp. FIG. 7 is a flowchart illustrating operations of the control device in the first embodiment according to the present invention, and FIG. 8 is a flowchart illustrating other operations (interruption processing). FIG. 7 and FIG. 8 illustrate the processing flow of the microprocessor U2. FIG. 9 is a flowchart illustrating operations of the LED lamp in the first embodiment according to the present invention. FIG. 9 illustrates the processing flow of the microprocessor U4.

As illustrated in FIG. 6, in one building or room, a number of LED lamps 3a are installed. The plurality of LED lamps 3a are connected to the control device 2a through the power line 4. The control device 2a supplies the power to the plurality of LED lamps 3a, and controls them. In the respective LED lamps 3a connected to the control device 2a, a nonvolatile electrically-writable memory EEPM is provided inside the microprocessor U4. In a predetermined location of the memory EEPM, an address code and a user code, etc., are registered (stored) beforehand. By including the address code and the user code in the control signal, the control device 2a makes all or part of the connected LED lamps 3a perform an appropriate operation.

The operation panel part 15 of the control device 2a configures an interface part for a person who perform various kinds of settings of the LED lamps 3a or a person who uses the LED lamps 3a as illumination. The operation panel part 15 includes a push switch SW1, a load opening/closing switch SW2, and a plurality of (four, in the present embodiment) light emitting diodes LD1, LD2, LD3 and LD4.

Figure 10:
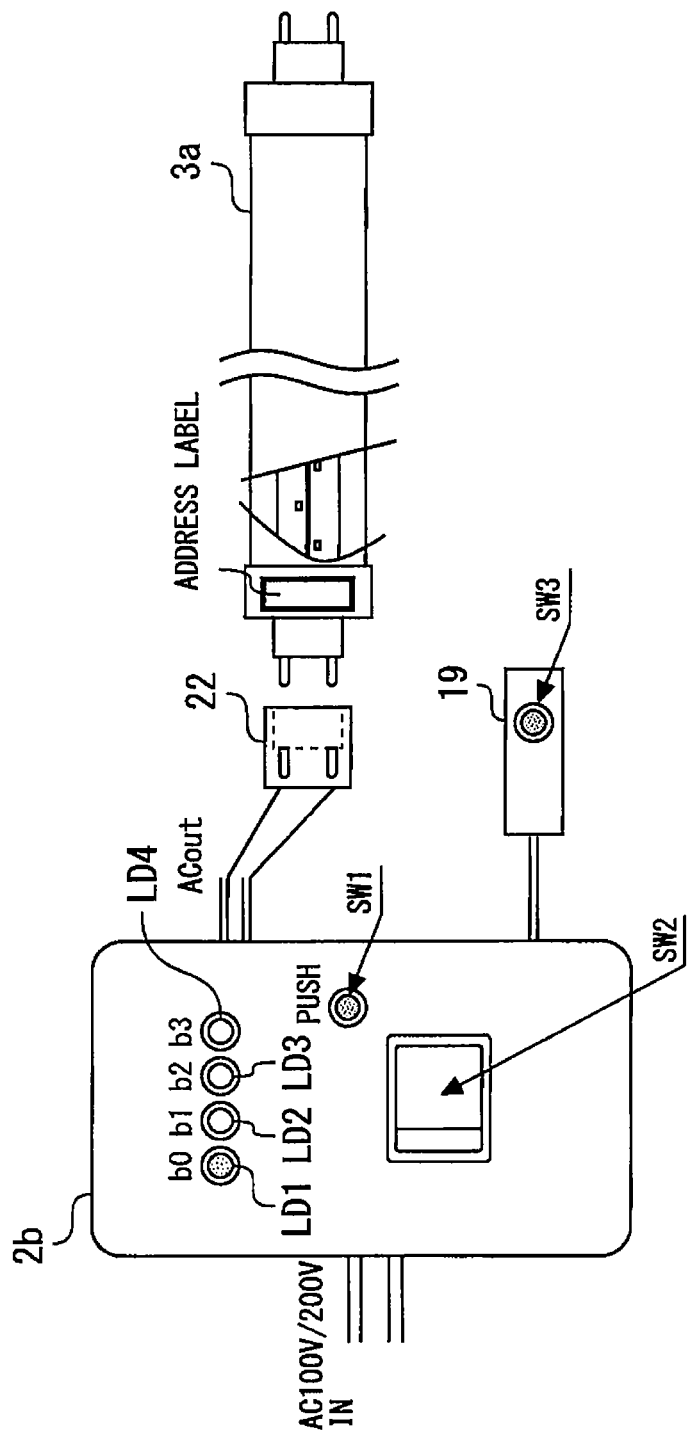
FIG. 10 is a diagram illustrating a configuration for setting an address code or the like to the LED lamp.
Figure 11:
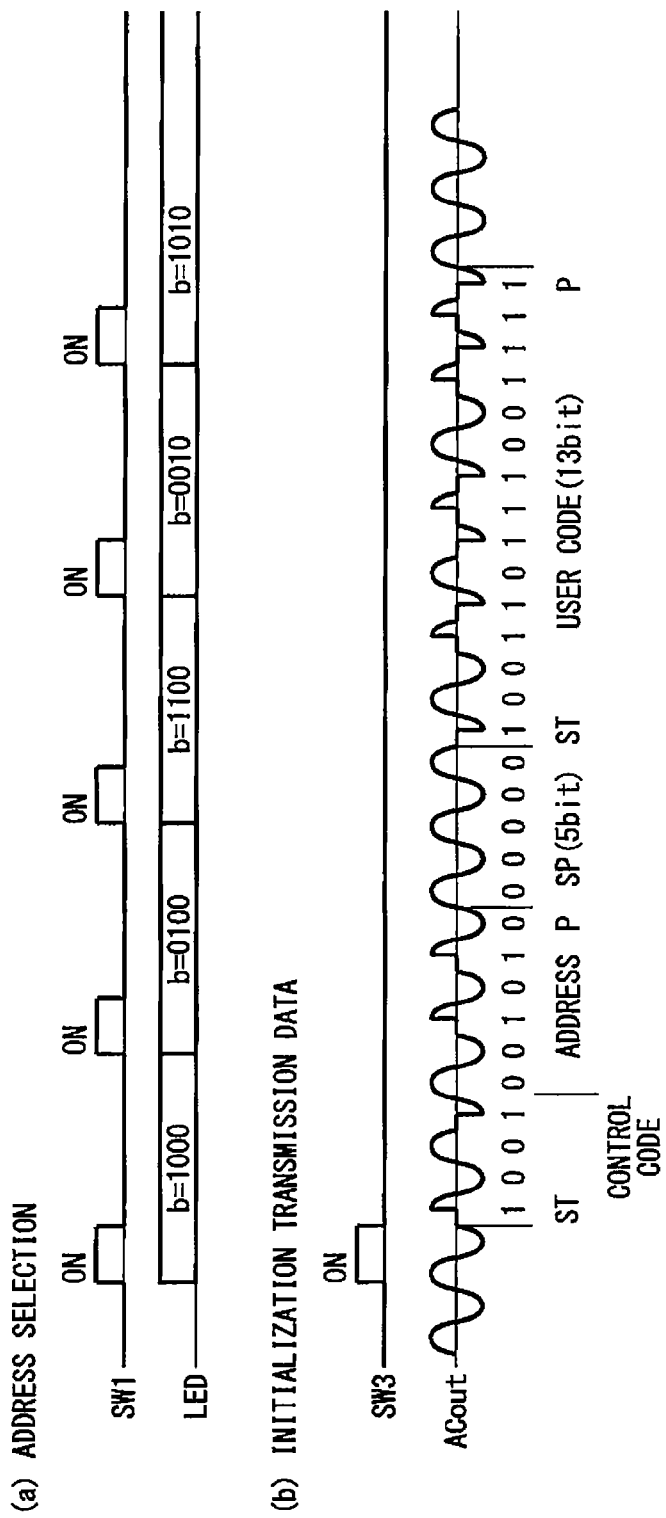

First, also with reference to FIG. 10 and FIG. 11, a method of setting the address code and the user code to the LED lamp 3a will be described. FIG. 10 is a diagram illustrating a configuration for setting the address code or the like to the LED lamp. FIG. 11 is a diagram for describing an operation when setting the address code or the like.

In FIG. 10, reference character 2b denotes an address setter. The address setter 2b sets the address code or the like to the LED lamp 3a. The address setter 2b has the configuration illustrated in FIG. 2, that is, a configuration similar to that of the control device 2a. In the present embodiment, the case that the control device 2a functions as the address setter 2b under a predetermined condition will be described.

An address setting key 19 operates the control device 2a as the address setter 2b. The address setting key 19 includes a push switch SW3. When a connector CN3-F of the address setting key 19 is connected to a connector CN1_M, in the microprocessor U2, CLK and DAT are changed from "L" to "H". Thus, the microprocessor U2 recognizes the address setting key 19 by a control program in the inside, and the control device 2a is shifted to an operation mode as the address setter 2b (Yes in S101 in FIG. 7).

When setting the address code or the like to the LED lamp 3a, that is, when initializing the LED lamp 3a, a socket 22 for connecting the LED lamp 3a is connected to the AC output terminals ACout_h and ACout_1 of the address setter 2b.

Hereinafter, a method of setting the address code to the LED lamp 3a by using the address setter 2b of the above-described configuration (the control device 2a shifted to the address setting mode) will be described. The address codes to be set to the LED lamp 3a are 4 groups of G1 to G4. The address codes to be set is composed of the 4 groups of G1 to G4 in consideration of the fact that influence of natural light (sunlight) is different depending on an installation location when many LED lamps 3a are to be installed in one room.

For instance, to the LED lamp 3a to be installed on a window side where the natural light often enters, the address code of the group G1 is imparted. Also, to the LED lamp 3a to be installed at a part where it is the most difficult for the natural light to enter, the address code of the group G4 is imparted. To the LED lamps 3a to be installed between the LED lamp 3a to which the address code of the group G1 is given and the LED lamp 3a to which the address code of the group G4 is given, the address codes of the groups G2 and G3 are given. Among them, the address code of the group G2 is given to the LED lamp 3a to be installed at a slightly bright location, and the address code of the group G3 is given to the LED lamp 3a to be installed at a slightly dark location.

After the control device 2a is operated as the address setter 2b by the above-described procedure, the LED lamp 3a to which the address code is to be set is connected to the socket 22. After the LED lamp 3a is connected to the socket 22, the load opening/closing switch SW2 is pressed and the power is supplied to the LED lamp 3a.

While the control device 2a is operated as the address setter 2b, the light emitting diodes LD1 to LD4 of the operation panel part 15 display setting addresses in a binary manner. Also, the push switch SW1 is used for selecting the address code to be set. That is, by pressing the push switch SW1, the address code to be transmitted from the address setter 2b to the LED lamp 3a can be successively changed. Also, the selected address code is displayed by the light emitting diodes LD1 to LD4. (S102 in FIG. 7).

FIG. 11(a) illustrates a time chart for the time of selecting the address code. When the push switch SW1 is pressed, every time it is pressed, a combination of the light emitting diodes LD1 to LD4 to be lit is changed according to the selected address code. In an example indicated in FIG. 11(a), when the push switch SW1 is pressed once, an address code "1000" is selected. At the time, in the operation panel part 15, only the light emitting diode LD1 is lit. An operator looks at the display and determines whether or not the address code to be set is selected at present. When the push switch SW1 is pressed once again, the next address code "0100" is selected. At the time, in the operation panel part 15, only the light emitting diode LD2 is lit.

When an appropriate address code is selected by pressing the push switch SW1, the operator presses the push switch SW3 of the address setting key 19. When the push switch SW3 is pressed, the address setter 2b transmits the control signal including a predetermined initialization code to the LED lamp 3a (S103 in FIG. 7). The control signal at this time includes, in addition to a predetermined control code (initialization code), the selected address code and the user code registered in the address setter 2b beforehand. FIG. 11(b) illustrates a time chart of the control signal transmitted when initializing the LED lamp 3a.

In an example indicated in FIG. 11(b), the control signal is constituted of a start bit ST (1 bit), a control code (initialization code) (3 bits), an address code (5 bits), a parity bit P (1 bit)+space SP (5 bits)+ST (1 bit), and a user code (13 bits). The address setter 2b transmits the control signal to the LED lamp 3a by the above-described method of interrupting the power supply to the LED lamp 3a.

In the LED lamp 3a, the section width (that is, the pulse interval) of RA1="L" is measured in the microprocessor U4, and the control signal is demodulated. When the initialization code is included in the control signal, the microprocessor U4 specifies the address code and the user code included in the control signal, and records the specified address code and user code in the internal memory EEPM.

With the configuration, only by preparing a simple address setting key 19, required information (for instance, the address code and the user code) can be written into the memory EEPM of the LED lamp 3a from the control device 2a, and the LED lamp 3a can be initialized. The LED lamp 3a does not need an exclusive structure (for instance, a setting switch or the like) for initialization. Therefore, the LED lamp 3a can be made into a sealed structure, and reliability can be improved. Also, when highly confidential information is given as the user code, it can also contribute to theft prevention of the LED lamp 3a.

Figure 12:
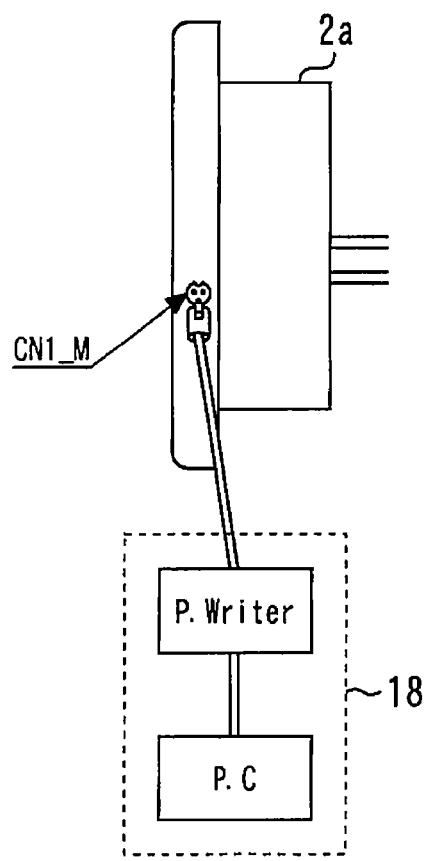
FIG. 12 is a diagram illustrating a configuration for setting a user code to the control device.

FIG. 12 is a diagram illustrating a configuration for setting the user code to the control device.

The program input part 18 inputs a required program to the control device 2a. The program input part 18 includes a writer P. Writer and a computer PC. The computer PC has a function of preparing a control program required for the control of the control device 2a. By connecting a connector CN1_F of the program input part 18 to a connector CN1_M, the control program prepared in the computer PC can be written into the control device 2a. For instance, by writing the user code into the control device 2a from the program input part 18, the control device 2a can be initialized.

Next, also with reference to FIG. 13 to FIG. 15, a concrete example of signals transmitted and received between the control device 2a and the LED lamp 3a will be described. FIG. 13 is a diagram illustrating an example of the control signal transmitted from the control device to the LED lamp.

As illustrated in FIG. 6, when many LED lamps 3a are installed in one building or room, the same user code is registered beforehand to the respective LED lamps 3a and the control device 2a which controls them. The LED lamps 3a are divided into a plurality of groups, for instance, and the same address code is registered to the LED lamps 3a belonging to the same group. In the example indicated in FIG. 6, the LED lamps 3a are divided into groups G1 to G4 according to the installation locations and 10 LED lamps 3a are connected in each group.

In the control device 2a, when the load opening/closing switch SW2 is pressed during a normal operation mode in which the address setting key 19 is not connected (S104 in FIG. 7), a photocoupler U4 is operated, and RB4 of the microprocessor U2 is turned to "H". Thus, the microprocessor U2 recognizes power supply to the control device 2a. When detecting power supply, the microprocessor U2 transmits the predetermined control signal to all the connected LED lamps 3a. FIG. 13(a) indicates an example of the control signal transmitted to the LED lamps 3a when the power is supplied. The control signal at this time includes the user code registered in the control device 2a (S105 in FIG. 7).

In each LED lamp 3a connected to the control device 2a, when the control signal indicated in FIG. 13(a) is received from the control device 2a, the user code included in the control signal and the user code registered in the LED lamp itself are compared in the microprocessor U4 of the control part 20. When both user codes match, the LED lamp 3a shifts to a lightable state. When both user codes do not match, the LED lamp 3a is turned to an unlightable state. That is, when both user codes do not match, the control part 20 of the LED lamp 3a blocks the current to the LED modules U8 and U9 and does not make the LED element in the inside emit light. This state is held until the control signal including the user code that matches the user code registered in the LED lamp itself is transmitted.

The LED lamp 3a is expensive compared to lamps of the other kinds. Also, the LED lamp 3a can be easily detached from a socket. The LED lamp 3a of the above-described configuration is not lit unless the user codes match. That is, even if the LED lamp 3a used in a predetermined location is to be used in another location, it cannot be used by the control device 2a with a different registered user code. Therefore, theft of the LED lamp 3a can be prevented.

FIG. 13(b) indicates an example of the control signal transmitted when controlling the LED lamp 3a by each address code. After transmitting the control signal indicated in FIG. 13(a), the control device 2a transmits the control signal indicated in FIG. 13(b) to the respective LED lamps 3a in order to light the LED lamps 3a with appropriate illuminance (output). For instance, after transmitting the control signal indicated in FIG. 13(a), when it is detected that the push switch SW1 is pressed (Yes in S106 in FIG. 7), the control device 2a outputs the control signal for lighting the respective LED lamps 3a with the appropriate illuminance (S110 in FIG. 7).

In the LED lamp 3a which receives the control signal indicated in FIG. 13(b), the control part 20 (specifically, the microprocessor U4) makes the LED elements inside the LED modules U8 and U9 emit light according to a demodulation result of the control signals, and appropriately controls the illuminance.

FIG. 13(c) indicates an example of the control signal transmitted when requesting predetermined illuminance measurement to the LED lamp 3a having a specific address code. For instance, after transmitting the control signal indicated in FIG. 13(a), the control device 2a determines necessity of illuminance measurement (S108 in FIG. 7), and when the illuminance measurement is needed, the control signal indicated in FIG. 13(c) is transmitted to the predetermined LED lamp 3a (S109 in FIG. 7).

In the following, a configuration and an operation for appropriately controlling the LED lamps 3a (in the above-described example, for lighting the LED lamps 3a with the appropriate illuminance for each group) will be described.

As described above, for instance, when a number of LED lamps 3a are installed in one room, some LED lamps 3a (group G1) are installed on a window side where the natural light often enters, and some LED lamps 3a (group G4) are installed at a part where it is the most difficult for the natural light to enter. In such a situation, it is not always needed to light the LED lamps 3a of the group G1 and the LED lamps 3a of the group G4 with the same illuminance.

Therefore, for instance, after construction of installing this control system to a building is ended, the natural light quantities around the installation location of the LED lamp 3a are measured with an illuminometer, and an indoor illuminance map (illuminance distribution) is prepared and inputted to the control device 2a. In that case, when transmitting the control signal indicated in FIG. 13(b), the control device 2a sets an illuminance command (output (5 bits)) for each address code according to the registered illuminance map, and lights the respective LED lamps 3a with appropriate illuminance. For instance, the control device 2a sets different illuminance command for each group (each address code) as needed such that the LED lamp 3a belonging to the group G1 has the lowest illuminance and the LED lamp 3a belonging to the group G4 has the highest illuminance.

Also, even after the illuminance map is prepared once, by measuring the illuminance of representative locations, the registered illuminance map may be periodically corrected.

An entering condition of the natural light (sunlight) that enters from a window or the like into a room is largely different depending on the time even on the same day. Also, even at the same time, when seasons are different, the entering condition of the natural light is largely different. Therefore, in addition to the illuminance map (or instead of the illuminance map), the control device 2a may have a function (calculation means) of calculating an incidence direction (direction/angle) of the natural light made incident on a location where the LED lamp 3a is installed.

In the control device 2a including the calculation means, for instance, the microprocessor U2 transmits, to the LED lamp 3a, the control signal for making the LED element emit light according to the ambient illuminance by interrupting the power supply to the LED lamp 3a on the basis of the incidence direction calculated by the calculation means. When the control device 2a has the illuminance map, the illuminance map is corrected on the basis of the incidence direction calculated by the calculation means, and the different illuminance command for each address code may be set when transmitting the control signal indicated in FIG. 13(b).

The calendar part 17 of the control device 2a includes a crystal vibrator X1, and a real time clock U4. The real time clock U4 is composed of an integrated circuit (IC) having a communication function of outputting present information (year, month, date and time). In the control device 2a, the latitude and longitude of the location where the LED lamp 3a is installed are registered beforehand. The control device 2a obtains the time of sunrise and sunset and the height of the sun and calculates the incidence direction of the natural light on the basis of the information on the latitude and the longitude and present information from the calendar part 17.

In order to appropriately adjust the illuminance of the LED lamp 3a for each group, some of the information required for the adjustment may be inputted from the outside (for instance, by a person at the location).

At the operation panel part 15 of the control device 2a, a button (input means) for inputting the information required for the adjustment, the information to be an index of the natural light quantity at the location where the LED lamp 3a is installed, for instance, is installed.

In the control device 2a including the input means, for instance, the microprocessor U2 transmits, to the LED lamp 3a, the control signal for making the LED element emit light according to the ambient illuminance by interrupting the power supply to the LED lamp 3a on the basis of the information inputted from the input means (in the above-described example, the pressed button). When the control device 2a includes the illuminance map, the illuminance map may be corrected on the basis of the information inputted from the input means and the illuminance command different for each address code may be set when transmitting the control signal indicated in FIG. 13(b).

FIG. 6 illustrates the operation panel part 15 of the control device 2a where buttons corresponding to "sunny", "cloudy", "rainy" and "night" are installed, as one example. For instance, when the button of "sunny" is pressed, the control device 2a generates the control signal such that the illuminance of the LED lamp 3a of the group G1 becomes the lowest. Alternatively, when the button of "sunny" is pressed, only the LED lamps 3a belonging to the group G1 may be put out. Also, when the button of "night" is pressed, the control device 2a generates the control signal such that all the LED lamps 3a become the same illuminance (and sufficient illuminance) regardless of the groups.

In order to set the illuminance at a value suitable for feelings of a person, it is needed to consider psychological influence of the person as well. By the above-described configuration, artificial elements are incorporated to appropriately set the illuminance of the LED lamp 3a. With the control system of the above-described configuration, not only the light with an energy saving effect but also the light which is the most suitable for the person at the location can be provided.

In order to appropriately adjust the illuminance of the LED lamp 3a for each group, some of the information required for the adjustment may be actually measured and acquired. In order to realize such a function, the present control system requires a sensor for measuring the information required for the adjustment and a function for transmitting the information obtained by the sensor to the control device 2a.

In the control system indicated in the present embodiment, the control part 20 of the LED lamp 3a includes means for measuring the ambient illuminance (illuminance measurement means). Specifically, the LED lamp 3a in the present embodiment includes a circuit (natural light quantity measurement circuit) for measuring the illuminance by the natural light at the location where the LED lamp 3a is installed, as the illuminance measurement means. The main part of the natural light quantity measurement circuit is constituted of the infrared light receiving element U3, the optical filter FL1 and one function of the microprocessor U4 of the control part 20.

Figure 14:
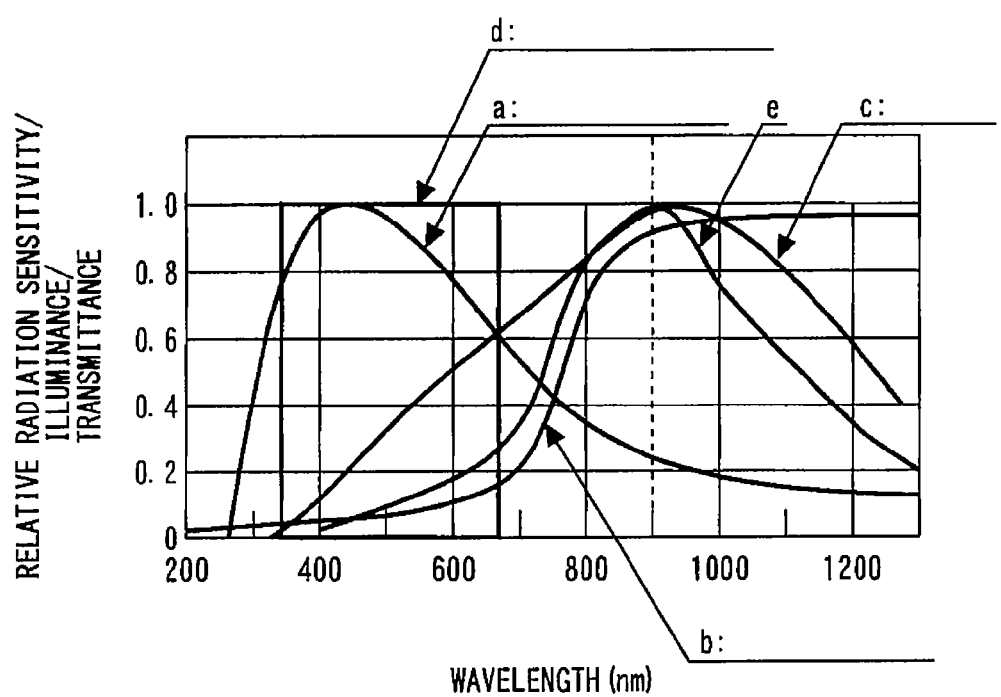
FIG. 14 is a diagram for describing a function of a natural light quantity measurement circuit.

FIG. 14 is a diagram for describing a function of the natural light quantity measurement circuit. Specifically, reference character a of FIG. 14 denotes relative illuminance to the wavelength of the sunlight. Reference character b denotes relative transmittance to the wavelength of the optical filter FL1. Reference character c denotes relative light receiving sensitivity to the wavelength of the infrared light receiving element (infrared sensor) U3. Reference character d denotes relative illuminance to the wavelength of the LED lamp 3a (LED module U8).

The infrared light receiving element U3 is an element for receiving the light of a predetermined wavelength region. The infrared light receiving element U3 is turned to a light irradiation surface of the corresponding LED module (U8, for instance). The optical filter FL1 is a filter for reducing the light from the LED module U8 (specifically, the LED element thereof), which is received by the infrared light receiving element U3. The optical filter FL1 is installed so as to cover a light receiving surface of the infrared light receiving element U3. Therefore, the infrared light receiving element U3 has sensitivity in a near-infrared region of the natural light.

A curve denoted by reference character e in FIG. 14 is general sensitivity to the wavelength of the infrared light receiving element U3 when measuring the illuminance. When measuring the illuminance, the LED lamp 3a (LED module U8) is lit. Also, on the infrared light receiving element U3, the light transmitted through the optical filter FL1 is made incident. As it can be recognized from the curve denoted by reference character e in FIG. 14, since the light from the LED module U8 is interrupted by the optical filter FL1, the light quantity of the natural light at the location where the LED module U8 is installed can be measured by the infrared light receiving element U3.

The terminal RA3 of the microprocessor U4 is an AD conversion input port. An out terminal of the infrared light receiving element U3 is connected to the RA3. In the microprocessor U4, the output of the infrared light receiving element U3 that is proportional to the natural light quantity is AD-converted in the RA3, and is stored in the inside.

In the LED lamp 3a, for instance, when the control signal indicated in FIG. 13(c) is received, the illuminance is measured by the illuminance measurement means of the above-described configuration. Then, in the LED lamp 3a, the information signal based on the illuminance measured by the illuminance measurement means is transmitted to the control device 2a through the power line 4 (a lamp line, in the present embodiment).

Below, also with reference to FIG. 15, a method of transmitting the information signal based on a measurement result of the infrared light receiving element U3 (illuminance data of the natural light) to the control device 2a will be described. FIG. 15 is a diagram for describing a transmission/reception method of the illuminance data.

In the control device 2a, after the power supply is recognized in S104 in FIG. 7, whether or not illuminance measurement of the natural light in the LED lamp 3a is required is determined (S108 in FIG. 7). A condition for measuring the illuminance of the natural light is determined beforehand. The control device 2a determines that the illuminance measurement of the natural light is required by pressing of the push switch SW1 of the operation panel part 15 or activation of a predetermined timer, for instance (Yes in S108 in FIG. 7). In that case, the control device 2a transmits the control signal (illuminance measurement request) indicated in FIG. 13(c), for instance, to the LED lamp 3a. The control signal indicated in FIG. 13(c) is the one for the time of requesting the illuminance measurement to the LED lamp 3a to which the address code "00000111" is given. The control code of the illuminance request is preset to "110", for instance.

In the LED lamp 3a which receives the illuminance measurement request, as described above, the output of the infrared light receiving element U3 that is proportional to the natural light quantity is AD-converted, and stored inside the microprocessor U4. The microprocessor U4 converts the illuminance data (the illuminance measured by the infrared light receiving element U3) stored in the inside to a pulse interval code by a predetermined control program, and transmits it to the control device 2a. For instance, the microprocessor U4 generates a pulse signal whose interval becomes shorter as the illuminance measured by the infrared light receiving element U3 is higher. An example indicated in FIG. 15(a) indicates the case of generating the signal by making pulse intervals of Wx0, Wx1 and Wx2 be proportional to the illuminance measured by the infrared light receiving element U3.

The microprocessor U4 outputs the signal converted to the pulse interval from the terminal RA2, and executes switching drive of the field effect transistor (FET) Q2. When the field effect transistor Q2 is driven, a signal current Ips determined by the resistor R17 is outputted from the AC input terminals ACin_h and ACin_1. That is, the function of the variation means 12 is realized by the field effect transistor (FET) Q2 and the resistor R17. The microprocessor U4 (transmission means 13) transmits the information signal by executing the switching drive of the field effect transistor (FET) Q2 and generating the pulse-like current variation at a predetermined interval.

Reference character AC indicated in FIG. 15(b) denotes a terminal voltage waveform of the ACin_h and ACin_1, and reference character Q2-G denotes a gate voltage (a pulse driving a gate) of the field effect transistor Q2. Since there is relationship of the signal current Ips=AC/R17, in order to turn the signal current Ips into a sufficient size, it is desirable to output a pulse near a peak of the terminal voltage waveform AC. In the microprocessor U4, the terminal voltage waveform AC at the point P2, that is, at the terminal RA1 is measured, and the timing of pulse output is determined.

FIG. 15(c) indicates a voltage waveform at the point P2, which is the waveform when clamping is performed to be Vcc=+5V in the diode D2 for clamping. The microprocessor U4 outputs the pulse at the timing after the lapse of a ¼ cycle Tp of the terminal voltage waveform AC from the point (for instance, a tz point) of 0V of the waveform indicated in FIG. 15(c). FIG. 15(b) indicates the relationship when the pulse is outputted at that timing.

The pulse detection part 16 of the control device 2a detects the pulse interval code transmitted from the control part 20 of the LED lamp 3a. That is, the function of the detection means 8 is realized by the pulse detection part 16. The pulse detection part 16 includes, for instance, a current transformer LF1, capacitors C4 and C5, a resistor R14, and an OP amplifier U3 for pulse amplification.

Figure 15:
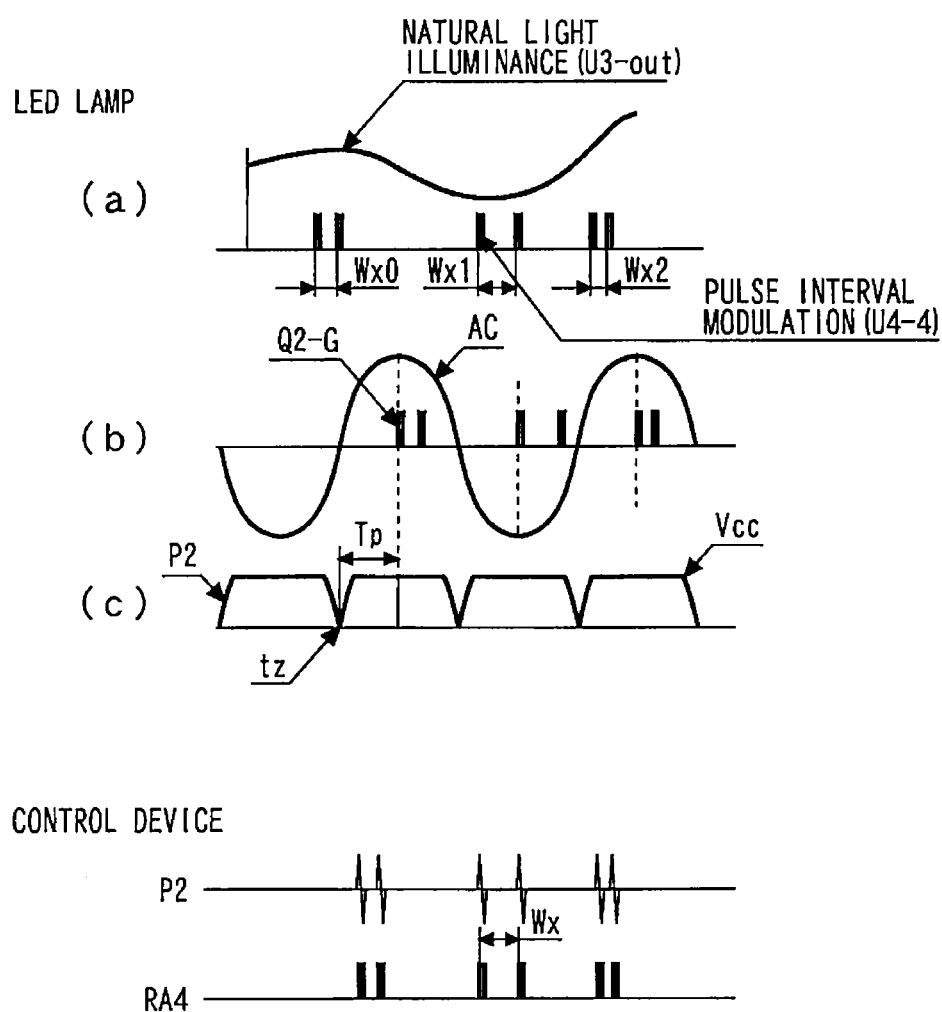
FIG. 15 is a diagram for describing a transmission/reception method of illuminance information.

In FIG. 15, for the control device 2a, the voltage waveform at the point P2 (see FIG. 2) at which the signal current Ips is detected by the current transformer LF1, the capacitors C4 and C5 and the resistor 14 is indicated in an upper stage. In a lower stage of FIG. 15, the output of the OP amplifier U3 for the pulse amplification, that is, the voltage waveform of the terminal RA4 of the microprocessor U2 is indicated.

The function of the demodulation means 9 is realized by one function of the microprocessor U2. That is, the microprocessor U2 measures a pulse interval Wx by the control program in the inside, on the basis of the output (input to the RA4) of the OP amplifier U3 for the pulse amplification. A condition for converting the illuminance of the LED lamp 3a to the pulse interval code is registered beforehand in the microprocessor U2. The microprocessor U2 demodulates the measured pulse interval Wx to the signal equivalent to U3-out in FIG. 15(a) on the basis of the conversion condition, and recognizes (specifies) the illuminance measured by the infrared light receiving element U3.

When the information signal received from the LED lamp 3a is demodulated (in the above-described example, the illuminance measured by the infrared light receiving element U3 is specified), the microprocessor U2 interrupts the power supply to the LED lamp 3a on the basis of the demodulation result, and transmits the control signal for making the LED element emit light according to the ambient illuminance to the LED lamp 3a. Thus, the LED lamp 3a can be lit with the appropriate illuminance (for each address code).

The LED lamps 3a having the function of measuring the ambient illuminance, that is, the LED lamps 3a including the infrared light receiving element U3 or the like, may be all or may be part of the LED lamps 3a controlled by the control device 2a. When the illuminance measuring function is provided in all the LED lamps 3a, the illuminance distribution of the natural light in the entire room can be accurately recognized in the microprocessor U2. Also, the illuminance measuring function may be provided in only one LED lamp 3a. In that case, when the illuminance map registered beforehand is corrected or the like according to the illuminance of the natural light recognized in the microprocessor U2, the respective LED lamps 3a can be lit with the appropriate illuminance. In this case, the input from the respective buttons of "sunny", "cloudy", "rainy" and "night" installed at the operation panel part 15 may further be utilized.

Next, other functions that the present control system has will be described.

The LED modules U8 and U9 of the LED lamps 3a are connected in parallel, and several tens of LED elements are connected in series in each inside. A terminal voltage Vled of the LED modules U8 and U9 is about 40 V.

Reference character I1 in FIG. 2 denotes the current of the LED module U8, and reference character I2 denotes the current of the LED module U9. It is defined that I1+I2=Is. Reference character R3 denotes a resistor for monitoring the current Is. A resistor R4 and a capacitor C7 configure a feedback circuit. A reference character L1 denotes an inductor coil, reference character D1 denotes a high-frequency switching diode, and reference character C6 denotes a smoothing capacitor.

A terminal 6CS of the integrated circuit (IC) U5 for the switching power source is a terminal for voltage monitoring input, and monitors a voltage drop of the resistor R3 caused by the current Is. A terminal 3PWM of the integrated circuit U5 is a terminal for control input, and has a function of determining a load current Is according to an input voltage. The terminal 3PWM of the integrated circuit U5 is connected to RA0 which is an analog output terminal of the microprocessor U4. The current Is (=I1+I2) is adjusted by the output voltage of the RA0. The microprocessor U4 receives the control signal from the control device 2a at the RA1, the illuminance command to the microprocessor U4 itself is read, and then outputs the voltage corresponding to the read illuminance from the RA0 to make the LED modules U8 and U9 be driven by the current Is (that is, makes the LED element emit light).

From characteristics of the LED element, the terminal voltage Vled is varied proportionally to a driving current. Also, in the configuration illustrated in FIG. 2, even one of the plurality of LED elements built in the LED module U8 is disconnected, the current I1 becomes 0. Similarly, even one of the plurality of LED elements built in the LED module U9 is disconnected, the current I2 becomes 0. In the meantime, the integrated circuit U5 for the switching power source maintains the current Is according to the voltage of the RA0 of the microprocessor U4. Thus, when disconnection occurs inside the LED module U8, for instance, the current Is (that is, twice the current as the current before the disconnection occurs inside the LED module U8) flows to the LED module U9 where the disconnection is not occurring, and as a result, the terminal voltage Vled is raised.

The microprocessor U4 monitors the terminal voltage Vled at the RA4 which is the terminal for AD conversion input, and when abnormality occurs in the terminal voltage Vled, the microprocessor U4 detects it. That is, the microprocessor U4 has a function of detecting the disconnection (of the LED module) on the basis of the terminal voltage of the LED module (disconnection detection means).

In the LED lamps 3a, by varying the current Is, the illuminance is controlled. Thus, in the microprocessor U4, it is needed to change a threshold for detecting the abnormality of the terminal voltage Vled according to the command value of the illuminance at the time (during the operation), that is, the voltage of the RA0, in the terminal RA5. In the following, a method of individually measuring and storing relationship between the output voltage of the RA0 and the terminal voltage Vled before shipping of products (LED lamps 3a) will be described. By adopting the following method, the threshold can be accurately set in consideration of variation during manufacturing.

The switch SW4 is a switch for shifting the LED lamp 3a to a threshold measurement mode for disconnection detection. The resistors R1 and R2 of the resistor part 21 are voltage dividing resistors for measuring the terminal voltage Vled.

In the LED lamp 3a, when the power is turned on in the state of turning ON the switch SW4, the microprocessor U4 is shifted to the threshold measurement mode. When shifted to the threshold measurement mode, the microprocessor U4 measures the terminal voltage Vled while changing the output voltage of the RA0. The microprocessor U4 records the threshold (the terminal voltage Vled, or a value determined from the terminal voltage Vled) in the memory EEPM in association with the output voltage of the RA0 on the basis of the measurement result. Thereafter, the LED lamp 3a is shipped in the state of turning OFF the switch SW4. In order to prevent a mischief or the like by a third person, for instance, the switch SW4 is disposed at such a location that it cannot be operated by the third person.

The microprocessor U4 compares the threshold recorded in the memory EEPM with the terminal voltage Vled, and determines presence/absence of the abnormality (disconnection). When the abnormality (disconnection) is detected by the rise of the terminal voltage Vled, the microprocessor U4 lowers the current flowing to the LED module with disconnection occurring, by changing the output voltage of the RA0. Also, when the abnormality (disconnection) is detected by the rise of the terminal voltage Vled, the microprocessor U4 converts information indicating the occurrence of the disconnection to the pulse interval code by the above-described method, and transmits it to the control device 2a through the power line 4.

In the control device 2a, after the power is supplied in S104 in FIG. 7, whether or not interruption processing needs to be performed is determined on the basis of input to an interruption reception terminal RA4 of the microprocessor U2 (S107 in FIG. 7). An interruption processing flow illustrated in FIG. 8 is activated when it is RA4="H".

In the control device 2a, when the RA4 of the microprocessor U2 becomes "H", whether or not the disconnection has occurred in the LED module U8 or U9 is determined on the basis of data received from the LED lamp 3a (S201, S202). If the disconnection has occurred in the LED lamp 3a, the microprocessor U2 reports the occurrence of the disconnection to the outside by making all the light emitting diodes LD1 to LD4 of the operation panel part 15 flicker or the like, for instance (S203).

By having such a disconnection detection function, in the illuminance variable LED lamps 3a, the disconnection which occurs inside the LED modules U8 and U9 can be surely detected, and abnormal heat generation of the LED lamps 3a can be prevented. Also, the occurrence of the disconnection can be surely reported to the outside.

Also, the LED lamp 3a has a function of turning a light emission amount from the LED modules U8 and U9 completely to 0, in addition to the disconnection detection function.

The field effect transistor (FET) Q4 blocks the current flowing to the LED modules U8 and U9 (blocking means). The field effect transistor Q4 is controlled by output from the terminal RA4 of the microprocessor U4. While the LED lamps 3a (LED modules U8 and U9) are lit, it is RA4="H", and the field effect transistor Q4 is in the conducted state.

The current Is cannot be completely turned to 0 (Is=0) even when the voltage of the terminal 3PWM is adjusted by the integrated circuit U5 for the switching power source since the variable range is limited. For instance, even when the control signal for putting out (that is, an instruction of output 0 W) is outputted from the control device 2a, the current Is is not turned to 0 only by adjusting the voltage of the terminal 3PWM, and slight brightness remains. In that case, for instance, even when the LED lamp 3a is to be put out to save energy during the rest time in an office, the power saving effect declines.

In the LED lamps 3a of the present control system, by turning the terminal RA4 of the microprocessor U4 to "L" when the control signal for putting out (that is, the instruction of the output 0 W) is received from the control device 2a, the current Is can be turned to 0. That is, the LED lamps 3a (LED modules U8 and U9) can be completely put out by a remote operation.

Furthermore, by utilizing a function capable of attaining the current Is=0, for instance, when the LED lamps 3a (LED modules U8 and U9) are made to flicker in a predetermined cycle, information can be sent as optical signals from the LED lamps 3a. When a flicker frequency is increased and a duty ratio is adjusted to be large, a surrounding person can be prevented from feeling that the LED lamps 3a are flickering when transmitting the optical signal. In that case, a receiver which receives the optical signal can be realized by a simple circuit constituted of a general-purpose light receiving element and a microprocessor.

Also, by lowering the flicker frequency and making the LED lamps 3a flicker in seconds, for instance, predetermined information can be transmitted to a person inside a room, too. For instance, when there is a person having difficulty in hearing is present inside the room, arrival of a visitor can be notified by making the LED lamps 3a flicker.

In such a manner, by the control system of the above-described configuration, the information using the light can be transmitted by adding the simple circuit, and the LED lamps 3a can be applied to uses other than illumination.

At the end of the present embodiment, with reference to FIG. 9, a series of operations of the LED lamps 3a having the various kinds of functions will be described.

The microprocessor U4 of the LED lamp 3a, when supplied with power from the control device 2a, first determines whether or not the switch SW4 is on (S301). If the SW4 is ON in S301, the microprocessor U4 performs the threshold measurement for disconnection detection described above (S302). The processing in S302 is performed, for instance, at a factory before shipping of the product.

After the LED lamp 3a is shipped as a product, the switch SW4 is OFF (No in S301). If the switch SW4 is OFF, the microprocessor U4 sets a flow management flag U_F to 0 (S303).

Next, the microprocessor U4 compares the terminal voltage Vled and the threshold inside the memory EEPM, and determines whether or not the disconnection has occurred inside the LED modules U8 and U9 (S304). When the disconnection is detected in S304, the microprocessor U4 perform required disconnection processing such as the control of the current Is and notification to the control device 2a (S305).

When the disconnection is not detected in S304, the microprocessor U4 determines whether or not the start bit ST is detected (S306). If the start bit ST is not detected, the microprocessor U4 returns to processing in S304, that is, an ST monitoring loop.

When the control signal is transmitted from the control device 2a, the start bit ST is surely included in the control signal. When the control signal is transmitted from the control device 2a and the start bit ST is detected, the microprocessor U4 of the LED lamp 3a reads reception data after the start bit ST by the above-described demodulation method (S307). Reference characters b0 to b15 indicated in FIG. 9 denote the reception data. The microprocessor U4 stores the reception data in Rx and control data in A. For instance, when the control signal as indicated in FIG. 13 is transmitted, the control code A is allocated to b0 to b2.

When the reception data is read, the microprocessor U4 determines the contents of the control code A (S308 to S311). The contents of the control code A are registered beforehand. For instance, A=001 means an initialization mode, A=010 means a determination mode of a user code U_C, A=100 means a control mode for each address code, and A=110 means an illuminance measurement mode.

For instance, when the specific control code A is "001", the microprocessor U4 stores the address code and the user code in the memory EEPM (S312). Thereafter, the microprocessor U4 returns to the ST monitoring loop.

Also, when the specific control code A is "010", the microprocessor U4 recognizes that the received control data is power supply data, and determines whether or not the user code U_C included in the control signal (that is, of the Rx) coincides with the user code U_C registered beforehand in the memory EEPM (S313). When the user code U_C included in the control signal coincides with the already registered user code U_C, the microprocessor U4 sets the flow management flag U_F to 1 (S314). When the user code U_C does not coincide in S313, and when the flow management flat U_F is set to 1 in S314, the microprocessor U4 returns to the ST monitoring loop.

When the flow management flag U_F is 1 and the specific control code A is "100", the microprocessor U4 makes the LED modules U8 and U9 emit light with the illuminance specified by the control signal (S315).

When the flow management flag U_F is 1 and the specific control code A is "110", the microprocessor U4 measures the illuminance using the infrared light receiving element U3, and transmits the pulse interval code according to the measurement result to the control device 2a (S316).

In the present embodiment, the example of dividing the LED lamps 3a connected to the control device 2a into four groups G1 to G4 and giving the same address code to the LED lamps 3a of the respective groups is indicated. However, it is only an example. Needless to say, the illuminance can be set finer by increasing the number of groups. Also, the different address code may be given to each LED lamp 3a connected to the control device 2a. In that configuration, the respective LED lamps 3a can be lit with the optimum illuminance according to the respective installation locations.

Second Embodiment

Figure 16:
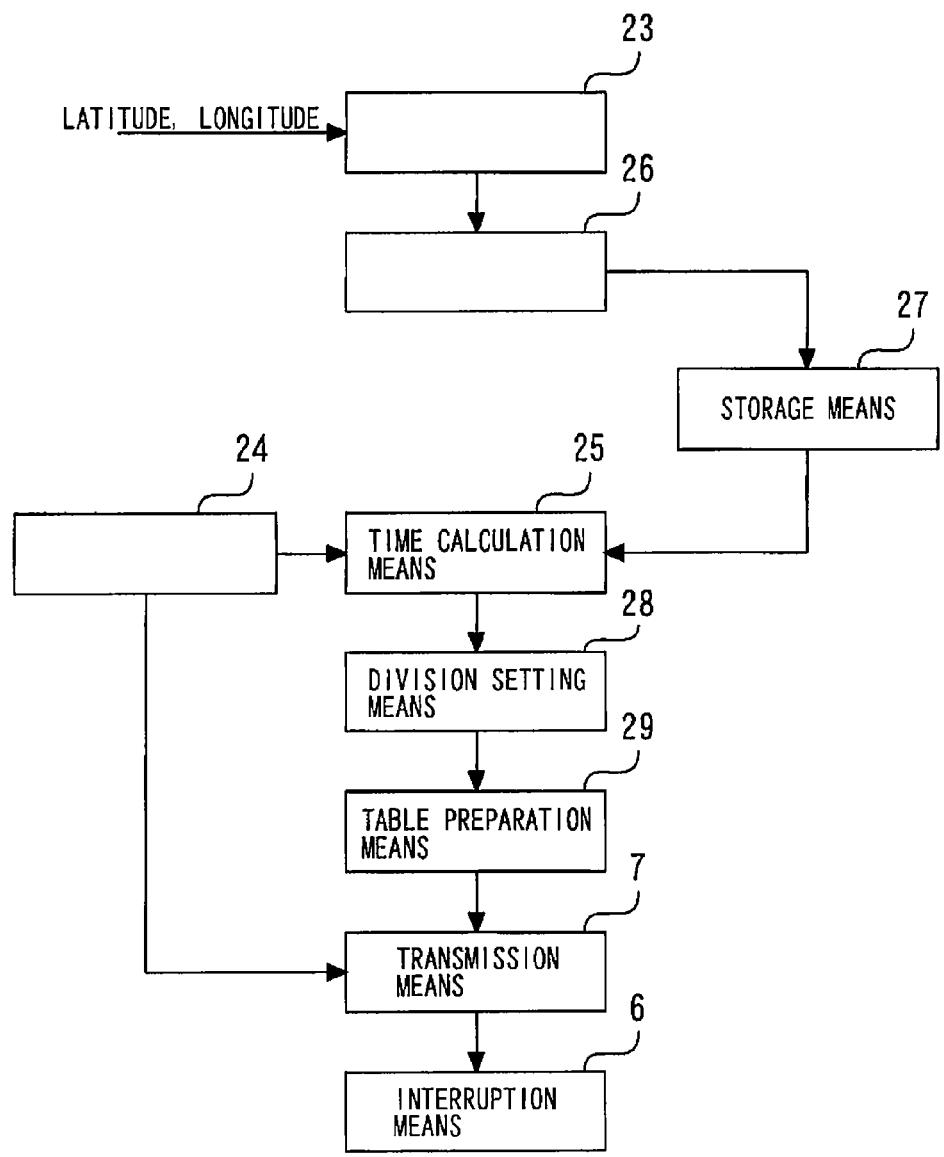
FIG. 16 is a diagram illustrating a configuration of a main part of a control system in a second embodiment according to the present invention.

FIG. 16 is a diagram illustrating a configuration of a main part of the control system in a second embodiment according to the present invention. FIG. 16 illustrates only a part required for describing the present embodiment. Of the configuration of the control system, the configuration of the part not illustrated in FIG. 16 is the same as the configuration disclosed in the first embodiment. That is, the control system in the present embodiment can have the various kinds of functions described in the first embodiment, in addition to the functions described below.

In the present embodiment, the case where the control device 2 transmits the control signal to the load 3 on the basis of the sunrise time and the sunset time will be described. That function is specially effective when the LED (light emitting diode) lamp is adopted as the load 3. Thus, in the present embodiment, the case where the control system includes the control device 2a and the LED lamp 3a will be concretely described.

The control device 2a includes graph preparation means 23, date and time information output means 24, time calculation means 25, element calculation means 26, storage means 27, division setting means 28, table preparation means 29, the transmission means 7 and the interruption means 6.

The graph preparation means 23 prepares a first graph indicating the sunrise time for a date. The first graph is a graph for specifying, when the date is specified, the sunrise time of the date. Also, the graph preparation means 23 prepares a second graph indicating the sunset time for the date. The second graph is a graph for specifying, when the date is specified, the sunset time of the date.

The sunrise time and the sunset time are different depending on a location (position on the Earth). In order to prepare the first graph and the second graph, the graph preparation means 23 acquires information on the latitude and information on the longitude of the location (for instance, the location where the control system is operated). The graph preparation means 23 prepares the first graph and the second graph on the basis of the acquired information on the latitude and the longitude.

Figure 17:
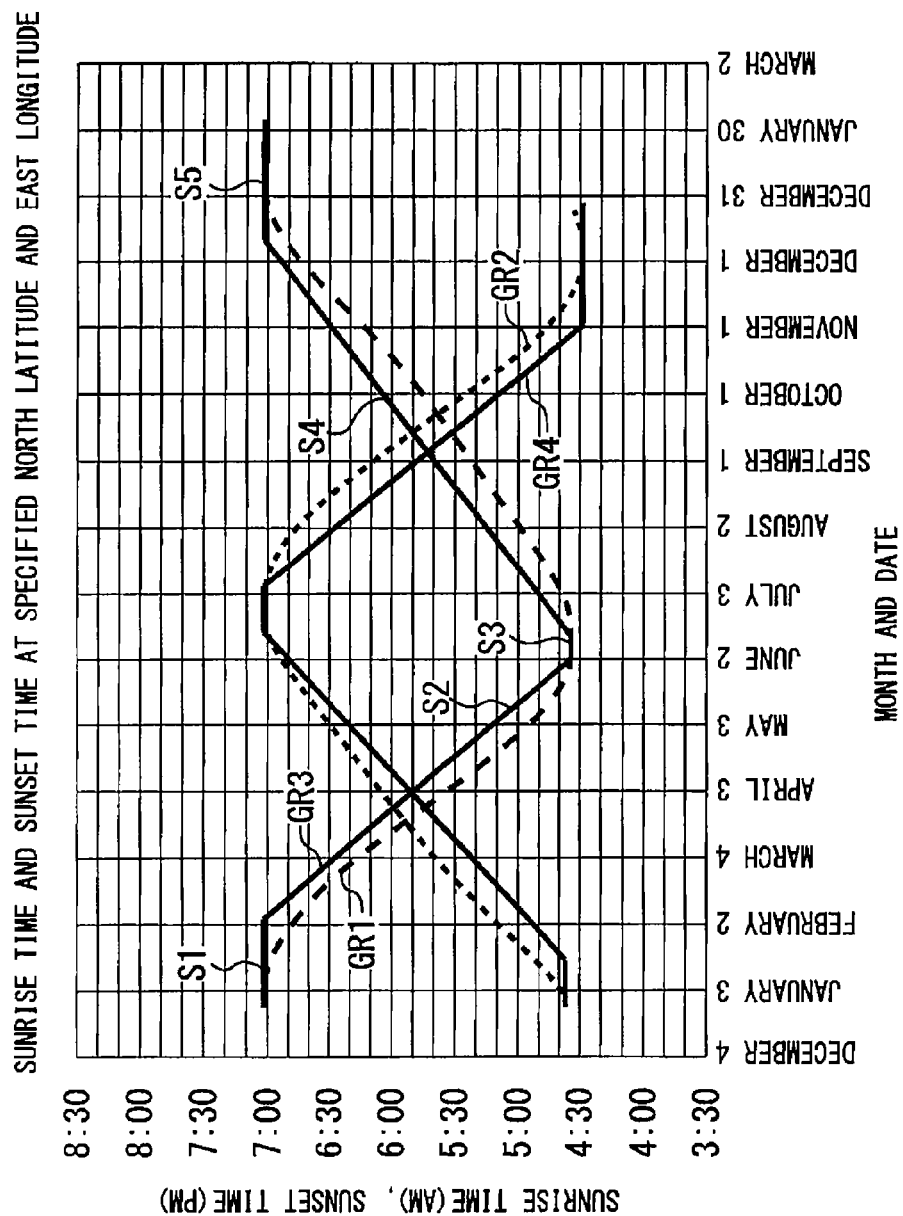
FIG. 17 is a diagram for describing a function of graph preparation means.

FIG. 17 is a diagram for describing a function of the graph preparation means.

Reference character GR1 in FIG. 17 indicates one example of the first graph prepared by the graph preparation means 23. The GR1 presents a sinusoidal shape and indicates an approximation equation including a trigonometric function. That is, the GR1 almost accurately indicates the sunrise time for the date. Reference character GR2 in FIG. 17 indicates one example of the second graph prepared by the graph preparation means 23. The GR2 presents the sinusoidal shape and indicates an approximation equation including a trigonometric function. That is, the GR2 almost accurately indicates the sunset time for the date.

The date and time information output means 24 outputs information on the present date and time. A function of the date and time information output means 24 is realized by the calendar part 17.

The time calculation means 25 calculates the sunrise time and the sunset time. The information on the date and time outputted from the date and time information output means 24 is inputted to the time calculation means 25. On the basis of the information inputted from the date and time information output means 24, the time calculation means 25 calculates the sunrise time and the sunset time of the date, for instance. Specifically, the time calculation means 25 calculates the sunrise time of the date on the basis of the first graph prepared by the graph preparation means 23. The time calculation means 25 calculates the sunset time of the date on the basis of the second graph prepared by the graph preparation means 23.

On the basis of the sunrise time and the sunset time calculated by the time calculation means 25, the transmission means 7 transmits the control signal to the LED lamp 3a. The transmission means 7 transmits the control signal to the LED lamp 3a through the power line 4 by interrupting the power supply to the LED lamp 3a by the interruption means 6.

As one example, the case of lowering the illuminance of the LED lamp 3a stepwise from dawn, and thereafter raising the illuminance stepwise toward the night is considered.

The time duration (0:00 to 23:59) of one day is equally divided into a plurality of frames beforehand. The frame is the minimum control unit into which 24 hours are divided for management. When controlling lowering and raising of the illuminance in k steps, for instance, the number (division number) i of the frames needs to satisfy i≥2k. For instance, in the case of lowering the illuminance of the LED lamp 3a to four stages, and then raising it to four stages, the number i of the frames of eight or more is needed. When the illuminance of the LED lamp 3a in this time period in the night is defined as 100%, the illuminance of the LED lamp 3a at the time changes as follows, for instance.

90%→80%→70%→60%→60%→70%→80%→90%

When a part in which the illuminance continues (in the above-described example, the part of 60%→60%) is not needed, the number i of the required frames is i≥2k−1.

Also, when only the propriety of mounting is considered, the number i of the frames may only satisfy i≥k.

The transmission means 7 specifies a frame number corresponding to the present time, and when the illuminance needs to be changed, transmits the control signal to the LED lamp 3a. The information on the date and time, which is outputted from the date and time information output means 24, is inputted to the transmission means 7. When the present time is defined as h hour(s) and m minute(s), and the number of frames of one day is defined as i, the transmission means 7 calculates the present frame number on the basis of the next equation.

$$n = i \times (h \times 60 + m)/(24 \times 60)$$

For instance, in the time period of lowering the illuminance of the LED lamp 3a, the transmission means 7 rounds down a part smaller than 1 of the calculation result to specify the present frame number. Thus, the time of lowering the illuminance of the LED lamp 3a can be allocated to later time and illuminance insufficiency can be prevented.

Also, in the time period of raising the illuminance of the LED lamp 3a, the transmission means 7 rounds up the part smaller than 1 of the calculation result to specify the present frame number. Thus, the time of raising the illuminance of the LED lamp 3a can be allocated to earlier time, and the illuminance insufficiency can be prevented.

When the number i of the frames is set to a large value, the illuminance of the LED lamp 3a can be finely adjusted, and a comfortable space can be provided. However, when the number i of the frames becomes large, a required memory also becomes large, and the control system becomes expensive.

Also, the functions of the graph preparation means 23, the time calculation means 25 and the transmission means 7 are realized by one function of the microprocessor U2. When the microprocessor U2 has a sufficient performance, the microprocessor U2 can perform the processing of preparing a sinusoidal graph and calculating the time from the graph and the like in a short time. However, by using a high-performance microprocessor U2, the control system becomes expensive.

In the following, a configuration for keeping the present control system inexpensive will be described.

Reference character GR3 in FIG. 17 indicates another example of the first graph prepared by the graph preparation means 23. The GR3 is a line graph. The GR3 does not indicate the sunrise time for the date more accurately than the GR1. However, by preparing the GR3 so as to correspond to the GR1, even the GR3 can almost accurately indicate the sunrise time for the date.

Reference character GR4 in FIG. 17 indicates another example of the second graph prepared by the graph preparation means 23. The GR4 is a line graph. The GR4 does not indicate the sunset time for the date more accurately than the GR2. However, by preparing the GR4 so as to correspond to the GR2, even the GR4 can almost accurately indicate the sunset time for the date.

As one example, the graph preparation means 23 prepares a line graph as the first graph such that the sunrise time becomes the same time for a fixed period.

For instance, the graph preparation means 23 keeps the sunrise time fixed (the first time) during a first period including the summer solstice (or, near the summer solstice). Also, the graph preparation means 23 keeps the sunrise time fixed (the second time) during a second period including the winter solstice (or, near the winter solstice). In Japan, the second time becomes the time later than the first time. The graph preparation means 23 prepares the first graph such that the sunrise time for the date is indicated by one straight line in a period between the first period and the second period. Thus, the line graph in a trapezoidal wave shape as indicated by the GR3 is prepared.

Similarly, the graph preparation means 23 prepares a line graph as the second graph such that the sunset time becomes the same time for a fixed period.

For instance, the graph preparation means 23 keeps the sunset time fixed (the third time) during a third period including the summer solstice (or, near the summer solstice). Also, the graph preparation means 23 keeps the sunset time fixed (the fourth time) during a fourth period including the winter solstice (or, near the winter solstice). In Japan, the third time becomes the time later than the fourth time. The graph preparation means 23 prepares the second graph such that the sunset time for the date is indicated by one straight line in a period between the third period and the fourth period. Thus, the line graph in the trapezoidal wave shape as indicated by the GR4 is prepared.

As another example, the graph preparation means 23 prepares a line graph as the first graph such that the sunrise time does not become earlier than the sunrise time of the same date obtained from the GR1. When such a first graph is prepared, in the control device 2a, the sunrise time is detected at the time later than the actual sunrise time. Thus, the time of lowering the illuminance of the LED lamp 3a can be allocated to later time, and the illuminance insufficiency can be prevented.

At the time, the graph preparation means 23 may prepare the first graph such that the sunrise time becomes the same time for a fixed period as described above.

Similarly, the graph preparation means 23 prepares a line graph as the second graph such that the sunset time does not become later than the sunset time of the same date obtained from the GR2. When such a second graph is prepared, in the control device 2a, the sunset time is detected at the time earlier than the actual sunset time. Thus, the time of raising the illuminance of the LED lamp 3a can be allocated to earlier time, and the illuminance insufficiency can be prevented.

At this time, the graph preparation means 23 may prepare the second graph such that the sunset time becomes the same time for a fixed period as described above.

The element calculation means 26 calculates an element required for calculating the sunrise time and the sunset time from the graph prepared by the graph preparation means 23. In the following, a function of the element calculation means 26 when the graph preparation means 23 prepares a line graph as the first graph will be specifically described.

For the line graph, the shape can be specified when there are information on change points and information on inclination of a straight line between the change points. The change point is a point at which the inclination of the graph is changed. That is, an intersection of two straight lines configuring the line graph is the change point. Also, in the present embodiment, points at both ends of the line graph are also included in the change points.

The element calculation means 26 calculates the information on the change points and the information on the inclination of the straight line between the change points, for the first graph prepared by the graph preparation means 23. The information on the change points includes the date and the sunrise time. Also, the element calculation means 26 calculates the information on the change points and the information on the inclination of the straight line between the change points, for the second graph prepared by the graph preparation means 23. The information on the change points includes the date and the sunset time.

The information calculated by the element calculation means 26 is stored in the storage means 27.

The time calculation means 25 calculates the sunrise time and the sunset time of the date on the basis of the information of the month and the date inputted from the date and time information output means 24 and the information stored in the storage means 27.

For instance, the time calculation means 25 calculates the sunrise time on the basis of the information related to the first graph which is stored in the storage means 27. As one example, the case where the line graph in the trapezoidal wave shape as indicated by the GR3 is prepared by the graph preparation means 23 is considered. In that case, the time calculation means 25 calculates the sunrise time by the following equations.

The sunrise time $TM1$ of a section $S1=b1$ ($b1$ is an intercept of the section $S1$)

The sunrise time $TM3$ of a section $S3=b3$ ($b3$ is an intercept of the section $S3$)

The sunrise time $TM5$ of a section $S5=b5$ ($b5$ is an intercept of the section $S5$)

Each of the sections S1 and S5 is a part of the second period. Thus, the b1 and b5 become the second time. The section S3 is the first period and the b3 becomes the first time.

The sunrise time $TM2$ of a section $S2=a2 \times D+b2$

The sunrise time $TM4$ of a section $S4=a4 \times D+b4$

Reference character D denotes the month and the date, reference character a denotes the inclination of a corresponding section, and reference character b denotes the intercept of the corresponding section.

Similarly, the time calculation means 25 calculates the sunset time on the basis of the information related to the second graph which is stored in the storage means 27.

The time calculation means 25 can calculate the sunrise time and the sunset time when the information stored in the storage means 27 is present. That is, the control device 2a may not include the graph preparation means 23 and the element calculation means 26. In that case, for instance, by another device including the function of the graph preparation means 23 and the function of the element calculation means 26, the information on the change points and the information on the inclination of the straight line between the change points for the first graph, and the information on the change points and the information on the inclination of the straight line between the change points for the second graph are calculated. Then, the information calculated by the device is stored in the storage means 27 of the control device 2a.

With that configuration, the similar function can be realized. Also, with that configuration, the control system can be configured at a lower cost.

The division setting means 28 sets the time duration for lowering the illuminance of the LED lamp 3a (also called "illuminance lowering time duration", hereinafter). Also, the division setting means 28 divides the set illuminance lowering time duration into the fixed number of time periods.

Hereinafter, a concrete function that the division setting means 28 will be described.

When the LED lamp 3a is installed in a certain room, the light from the sun enters the room in the daytime. Thus, there is no need of lighting the LED lamp 3a with the same illuminance in the night with no sun and in the daytime with the sun. When the illuminance of the LED lamp 3a is lowered in the daytime, an energy saving effect can be expected.

The division setting means 28 sets the illuminance lowering time duration on the basis of the sunrise time and the sunset time calculated by the time calculation means 25. The illuminance lowering time duration is the time duration for setting the illuminance below 100% when the illuminance of the LED lamp 3a in the night is defined as 100%. The illuminance lowering time duration may not be started right at the sunrise time. Since the sunlight does not sufficiently enter the room immediately after the sunrise time, the illuminance lowering time duration may be started after the lapse of the fixed time from the sunrise time. Similarly, the illuminance lowering time duration may not be ended right at the sunset time. Since the sunlight does not sufficiently enter the room immediately before the sunset time, the illuminance lowering time duration may be ended before the fixed time of the sunset time.

Figure 18:
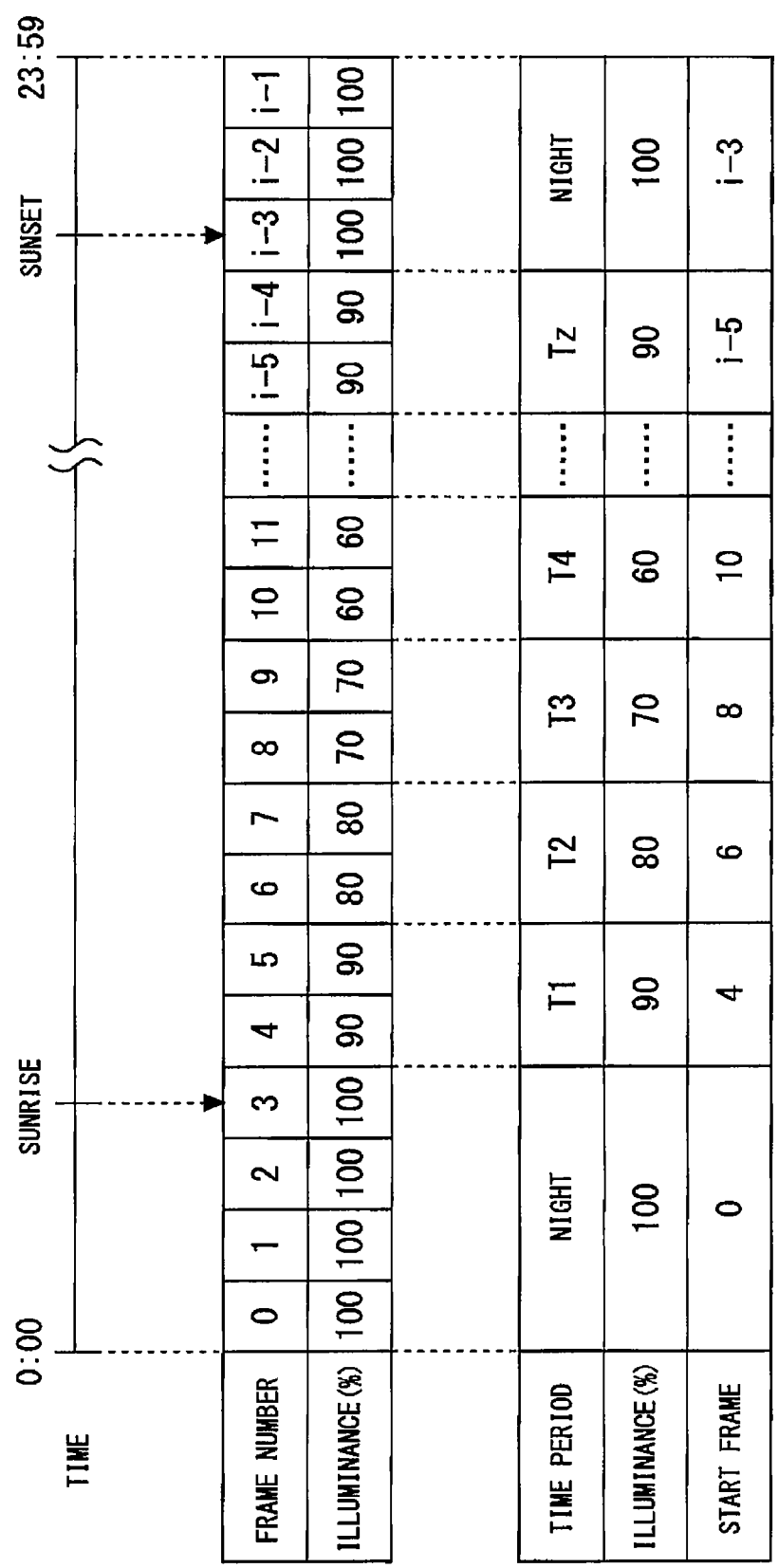
FIG. 18 is a diagram for describing a function of division setting means and a function of table preparation means.
Figure 19:
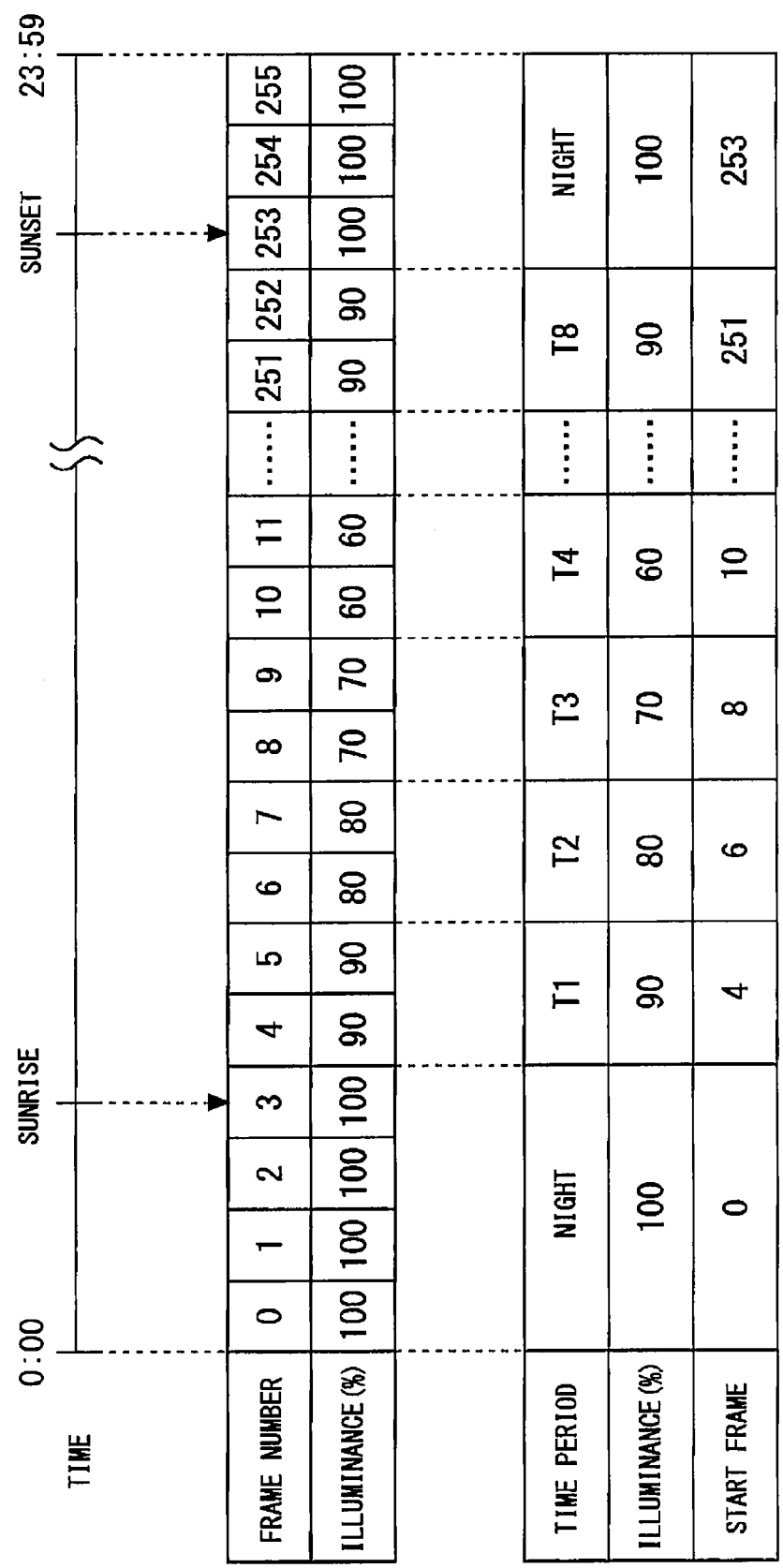
FIG. 19 is a diagram for describing the function of the division setting means and the function of the table preparation means.

FIG. 18 and FIG. 19 are diagrams for describing the function of the division setting means and the function of the table preparation means. First, with reference to FIG. 18 and FIG. 19, a setting example of the illuminance lowering time duration will be described.

As described above, the time duration (0:00 to 23:59) of one day is equally divided into a plurality of frames. FIG. 18 indicates the case of dividing one day into the number i of frames. FIG. 19 indicates the case of setting the number i of frames of one day to 256. FIG. 19 indicates a configuration for realizing the function of the division setting means 28 by an inexpensive 8-bit microprocessor, as one example.

In the example indicated in FIG. 19, the time duration of one day is equally divided into 256 from a 0th frame to a 255th frame. For instance, the time 0:00 is included in the first frame, that is, the 0th frame. The time 23:59 is included in the last frame, that is, the 255th frame.

The sunrise time calculated by the time calculation means 25 is also included in one of the frames. FIG. 19 indicates the case where the sunrise time is included in a third frame as one example. The division setting means 28 sets the illuminance lowering time duration such that the illuminance lowering time duration is started from a predetermined frame after the frame including the sunrise time, for instance, in order to prevent the illuminance insufficiency of the LED lamp 3a. In the example indicated in FIG. 19, the start frame of the illuminance lowering time duration is set at the frame next to (immediately after) the third frame including the sunrise time.

The sunset time calculated by the time calculation means 25 is also included in one of the frames. FIG. 19 indicates the case where the sunset time is included in a 253rd frame as one example. The division setting means 28 sets the illuminance lowering time duration such that the illumi- nance lowering time duration is ended at a predetermined frame before the frame including the sunset time, for instance, in order to prevent the illuminance insufficiency of the LED lamp 3a. In the example indicated in FIG. 19, the end frame of the illuminance lowering time duration is set at the frame immediately before the 253rd frame including the sunset time.

When changing the illuminance of the LED lamp 3a stepwise, the division setting means 28 divides the illuminance lowering time duration into the fixed number of time periods. FIG. 19 indicates the case of lowering the illuminance of the LED lamp 3a to four stages, and then raising it to four stages. That is, in the example indicated in FIG. 19, the division setting means 28 divides the illuminance lowering time duration into eight time periods (T1 to T8). Then, the division setting means 28 sets the start frames of the respective time periods.

The table preparation means 29 prepares an illuminance table required for controlling the illuminance of the LED lamp 3a. The illuminance table includes, for instance, information on the respective start frames of the time period in the night and the time periods divided by the division setting means 28, and information on the illuminance to be set to the respective time periods. As the time period in the night, there are the time period from the time 0:00 to the start of the illuminance lowering time duration, and the time period from the end of the illuminance lowering time duration to the time 23:59. The table preparation means 29 allocates the information on the illuminance to the respective time periods to complete the illuminance table.

The transmission means 7 specifies the illuminance set to the present frame number from the illuminance table, and transmits the corresponding control signal to the LED lamp 3a. When the power is supplied, for instance, the transmission means 7 transmits the control signal for changing the illuminance to the LED lamp 3a. Also, after that, when the present frame number is pertinent to the start frame of the respective time periods set in the illuminance table for the first time, the control signal for changing the illuminance is transmitted to the LED lamp 3a.

The functions of the element calculation means 26, the division setting means 28 and the table preparation means 29 are realized by one function of the microprocessor U2. Also, the storage means 27 is realized by a memory inside the microprocessor U2 or an external memory.

In the control system having the above-described configuration, the illuminance control of the LED lamp 3a according to the sunrise time and the sunset time can be realized. The illuminance lowering time duration can be changed according to the seasons, and the illuminance insufficiency does not occur. Also, since complicated calculation is not needed when realizing the control, the system can be constructed at a low cost.

Furthermore, even when the LED lamp 3a does not include a sensor for measuring the illuminance, the optimum illuminance control according to the seasons can be realized.

Figure 20:
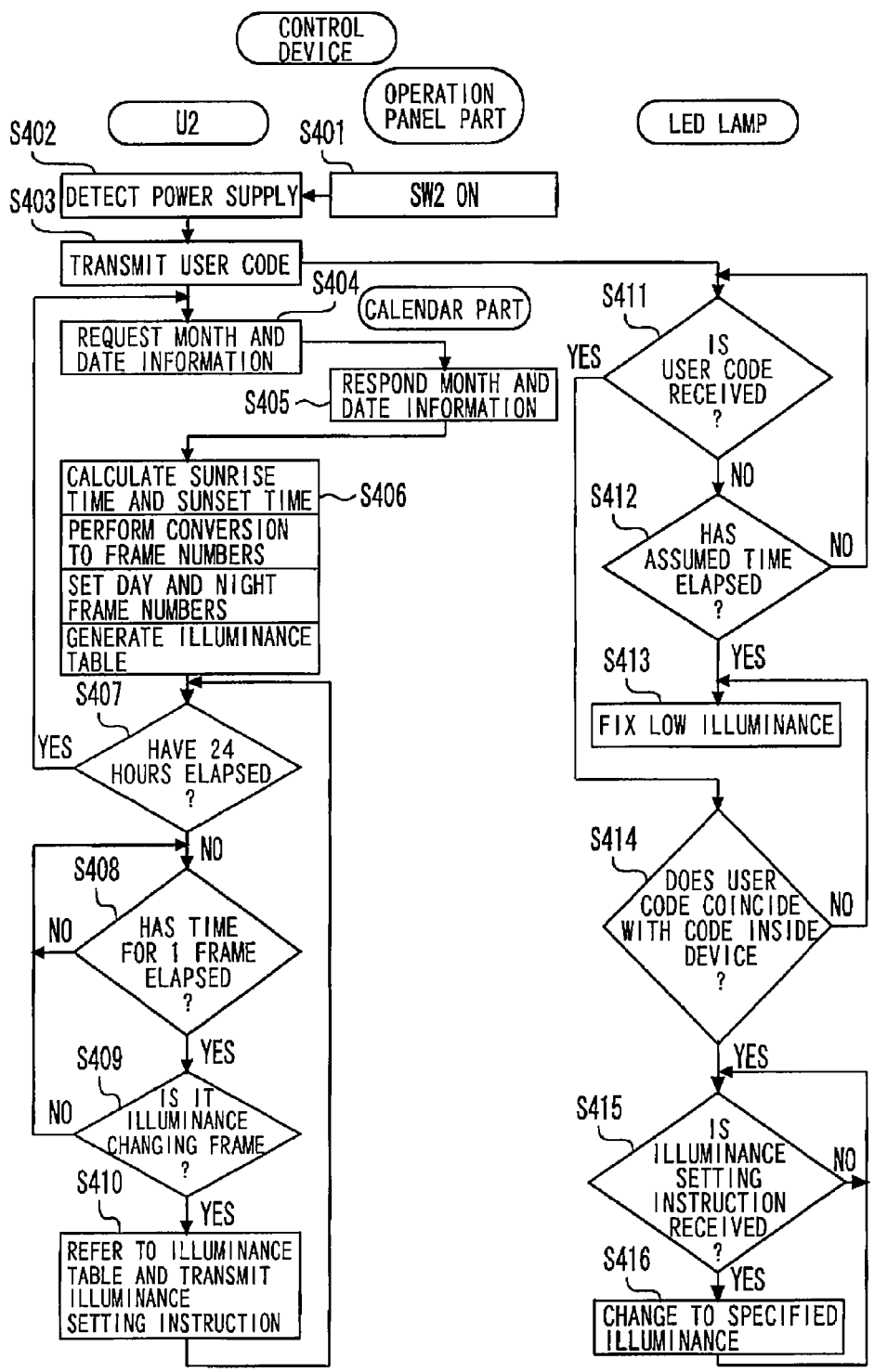
FIG. 20 is a flowchart illustrating operations of the control system in the second embodiment according to the present invention.

At the end of the present embodiment, with reference to FIG. 20, an operation example of the control system including the above-described functions will be described. FIG. 20 is a flowchart illustrating the operations of the control system in the second embodiment according to the present invention.

In the control device 2a, when the load opening/closing switch SW2 is pressed during a normal operation mode (S401), the microprocessor U2 detects the power supply (S402). Also, the power is supplied to the LED lamp 3a.

When the power supply is detected, the microprocessor U2 transmits the control signal including the user code to the LED lamp 3a (S403).

Next, the microprocessor U2 requests the information on the month and date to the calendar part 17 (S404). When the request is detected, the calendar part 17 transmits the information on the present month and date to the microprocessor U2 (S405).

When the information on the month and date is received from the calendar part 17, the microprocessor U2 performs each processing indicated in S406.

Specifically, the microprocessor U2 calculates the sunrise time and the sunset time on the basis of the received information on the month and date. Also, the microprocessor U2 converts the calculated sunrise time and sunset time to the frame numbers respectively, and sets day and night frame numbers. That is, the illuminance lowering time duration is set. Furthermore, the microprocessor U2 prepares the illumination table on the basis of the above-described preparation procedure.

Next, the microprocessor U2 determines whether or not 24 hours have elapsed (S407). That is, the microprocessor U2 determines whether or not the date has changed since the information on the month and date is received from the calendar part 17 last time. When the date has changed, the microprocessor U2 returns to the processing in S404, and prepares the illuminance table of a new date. When the date has not changed, the microprocessor U2 executes determination indicated in S408 and S409, and transmits the control signal for changing the illuminance to the LED lamp 3a as needed.

That is, the microprocessor U2 determines whether or not the time duration for one frame has elapsed (S408). When the time duration for one frame has elapsed, the microprocessor U2 determines whether or not the present frame is pertinent to an illuminance changing frame (S409). The illuminance changing frame is the frame in which the illuminance of the LED lamp 3a needs to be changed. In the example indicated in FIG. 18 and FIG. 19, the frame described as the start frame is pertinent to the illuminance changing frame. When the present frame is pertinent to the illuminance changing frame (Yes in S409), the microprocessor U2 refers to the illuminance table prepared in S406, and transmits the control signal for changing the illuminance to the LED lamp 3a (S410).

In the LED lamp 3a, when the power is supplied from the control device 2a, the microprocessor U4 determines whether or not the control signal including the user code is received from the control device 2a (S411). When the control signal including the user code is not received, the microprocessor U4 determines whether or not the stipulated time has elapsed (S412). When the stipulated time elapses before receiving the control signal including the user code (Yes in S412), the microprocessor U4 makes the LED modules U8 and U9 be lit with fixed low illuminance (S413). The illuminance at the time is set to a value lower than the lowest illuminance described in the illuminance table, for instance.

When the control signal including the user code is received before the stipulated time elapses (Yes in S411), the microprocessor U4 determines whether or not the received user code coincides with the user code inside the device (S414). When coincidence is not detected in determination in S414, the microprocessor U4 makes the LED modules U8 and U9 be lit with the fixed low illuminance (S413).

When the received user code coincides with the user code inside the device, the microprocessor U4 determines whether or not the control signal for changing the illuminance is received from the control device 2a (S415). When the control signal for changing the illuminance is received from the control device 2a after the coincidence is detected in the determination in S414, the microprocessor U4 changes the illuminance of the LED modules U8 and U9 (S416). Thus, the LED modules U8 and U9 are lit with the illuminance specified by the control signal.

Third Embodiment

Figure 21:
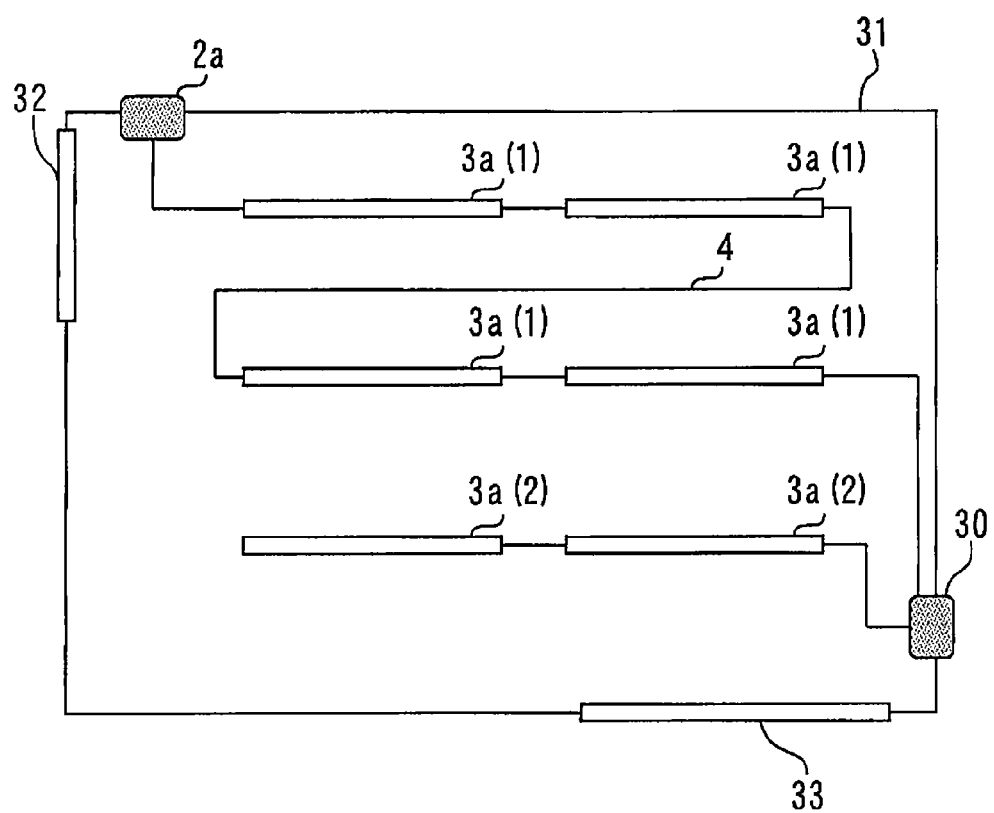
FIG. 21 is a diagram illustrating a schematic configuration of a control system in a third embodiment according to the present invention.

FIG. 21 is a diagram illustrating a schematic configuration of the control system in the third embodiment according to the present invention.

The control system in the present embodiment includes a switch 30. FIG. 21 indicates the case where two doorways 32 and 33 are provided in a room 31 as one example.

The control device 2a is installed near the doorway 32. The switch 30 is installed near the doorway 33. To the control device 2a, the plurality of LED lamps 3a are connected through the power line 4. Some LED lamps 3a are connected to the control device 2a through the switch 30. Hereinafter, when it is needed to specify the LED lamp to be turned ON/OFF by the load opening/closing switch SW2 of the control device 2a, a sign 3a1 is attached and expressed. Also, when it is needed to specify the LED lamp which can be turned ON/OFF by the switch 30, a sign 3a2 is attached and expressed.

Figure 22:
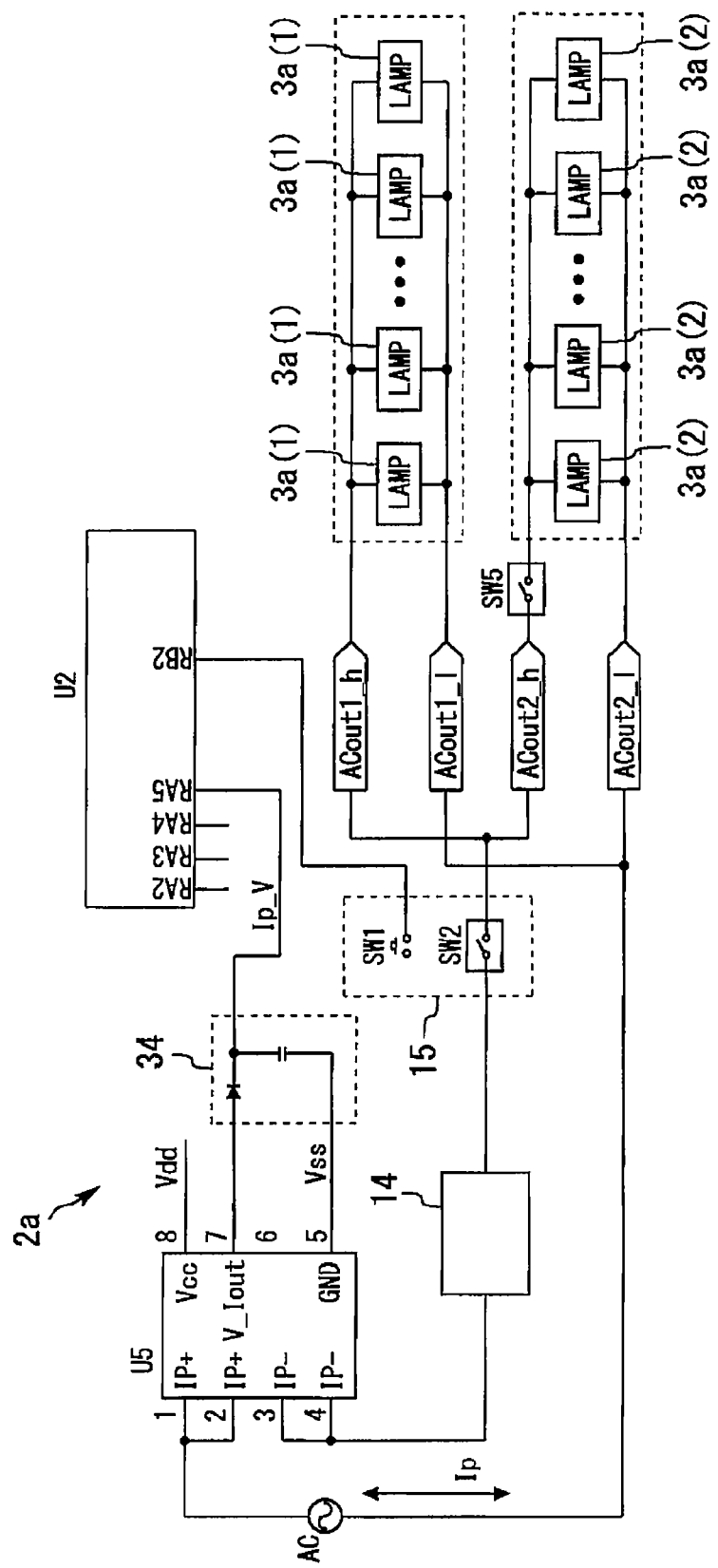
FIG. 22 is a diagram illustrating a concrete configuration of the control system in the third embodiment according to the present invention.

FIG. 22 is a diagram illustrating a concrete configuration of the control system in the third embodiment according to the present invention. FIG. 22 indicates only a part required in describing the present embodiment in the configuration of the control system. Of the configuration of the control system, the configuration of the part not illustrated in FIG. 22 is the same as the configuration disclosed in the first or second embodiment. That is, the control system in the present embodiment can have the various kinds of functions described in the first or second embodiment, in addition to functions described below.

Reference character SW5 indicated in FIG. 22 corresponds to the switch 30.

When the load opening/closing switch SW2 is turned ON in the state that all the LED lamps 3a installed in the room 31 are put out, the LED lamp 3a1 is lit. At this time, the control device 2a detects that the LED lamp 3a1 is activated, and transmits the control signal for security (for instance, the control signal including the user code or the like) to the LED lamp 3a1.

When the switch SW5 is turned ON while the LED lamp 3a1 is lit, the LED lamp 3a2 is lit. At this time, the control device 2a detects that the LED lamp 3a2 is activated, and transmits the control signal for the security to the LED lamp 3a2. When the LED lamp 3a2 is lit, the LED lamp 3a1 is already lit. The control device 2a detects that the LED lamp 3a2 is activated on the basis of the change of the load current supplied to the LED lamps 3a.

In the meantime, also when the LED lamp 3a1 is lit and the LED lamp 3a2 is put out, the control device 2a transmits the control signal for changing the illuminance to the LED lamp 3a1. When the illuminance of the LED lamp 3a1 is changed, the load current supplied to the LED lamps 3a is changed. At this time, the control device 2a does not need to transmit the control signal for the security. The control device 2a has a function for not transmitting the control signal when the current is changed by the change of the illuminance of the LED lamps 3a.

In order to realize such a function, the LED lamps 3*a* include current control means (not shown in the figure).

Figure 23:
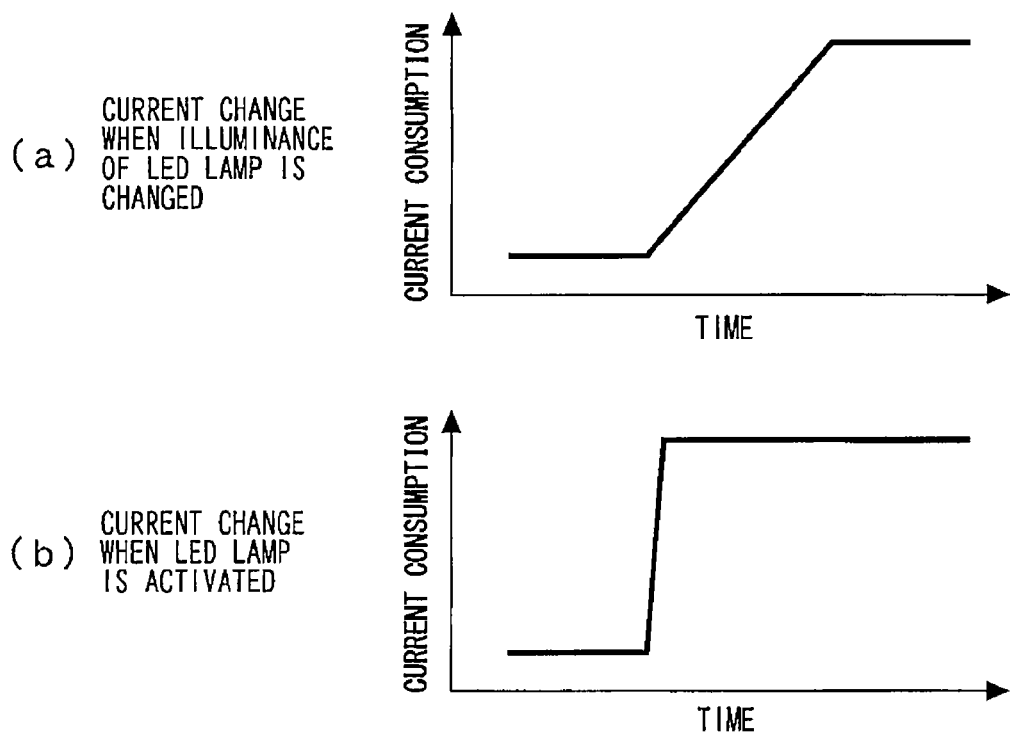
FIG. 23 is a diagram for describing a function of current control means.

FIG. 23 is a diagram for describing a function of the current control means. When the power is supplied and the LED lamp 3*a* is lit (at the time of activation), current consumption increases. In the LED lamp 3*a*, the current consumption also increases when the illuminance is increased. The current control means has a function of controlling the current flowing to the LED element. The current control means controls the current flowing to the LED element so that the change of the current is different at the time of activation and when changing the illuminance.

When an increase rate of the current consumption at the time of activation is defined as α1, and an increase rate of the current consumption when changing the illuminance is defined as α2, the current control means controls the current flowing to the LED element so as to be α1>α2. Thus, when the illuminance is changed, in the LED lamp 3*a*, the rise of the current consumption becomes slower compared to the time of activation. That is, the LED lamp 3*a* gradually becomes bright when the illuminance is changed, and the LED lamp 3*a* instantaneously becomes bright when activated.

The control device 2*a* includes determination means (not shown in the figure). When the load current to be supplied to the LED lamp 3*a* is changed, the determination means determines whether the change is caused by changing the illuminance of the LED lamp 3*a* or is caused by activating the LED lamp 3*a*. On the basis of the change rate of the current, the determination means specifies the current change caused by the activation of the LED lamp 3*a* (that is, the activation of the LED lamp 3*a*) and the current change caused by the illuminance change (that is, the illuminance change of the LED lamp 3*a*).

Also, even when the α1 is a value smaller than the α2, the determination means can make the determination when the relationship is registered beforehand.

The control device 2*a* includes, for instance, the integrated circuit U5 for AC current measurement, and a rectifier circuit 34. Reference numeral 14 indicated in FIG. 22 denotes the above-described power supply part, reference numeral 15 denotes the operation panel part, and reference character U2 denotes the microprocessor. Also, reference character Ip denotes the load current. The microprocessor U2 monitors the load current Ip on the basis of the input of the terminal RA5. The input of the terminal RA5 becomes a peak value Ip_V of the load current Ip.

In the present embodiment, a function of the determination means is realized by the integrated circuit U5, the rectifier circuit 34, and one function of the microprocessor U2.

Hereinafter, also with reference to FIG. 24 and FIG. 25, a series of operations performed by the control device 2*a* will be described.

Figure 24:
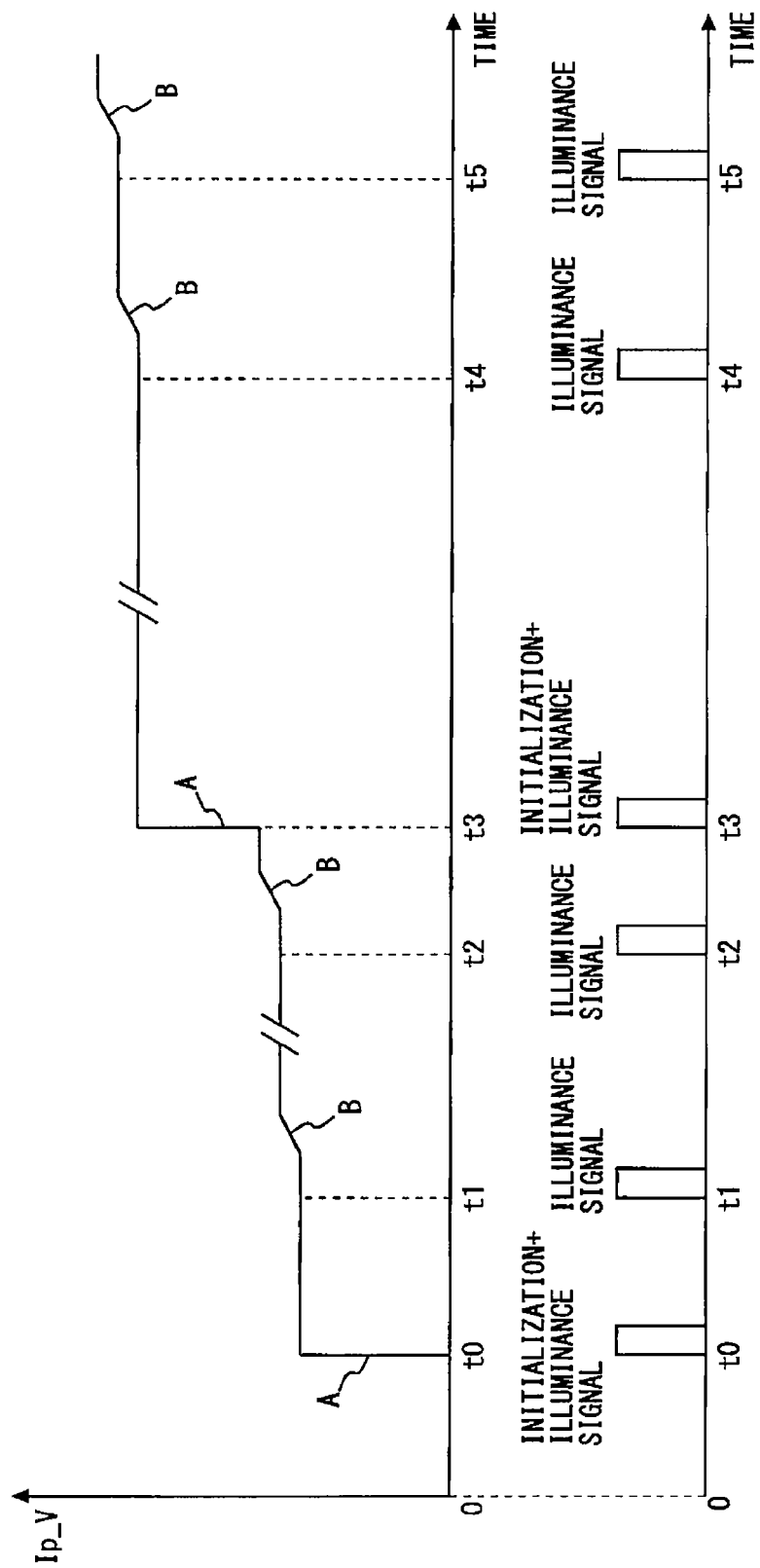
FIG. 24 is a time chart for describing operations to be performed by a control device.
Figure 25:
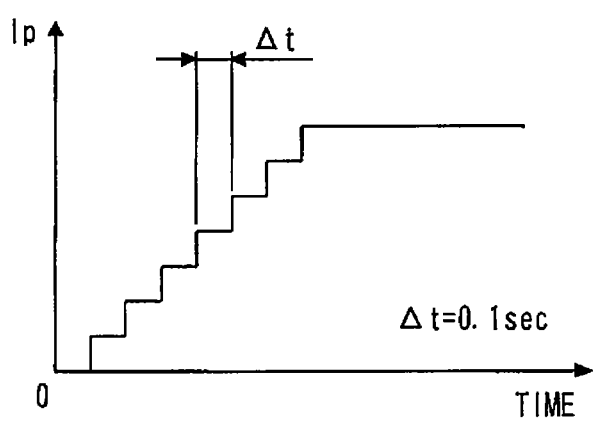
FIG. 25 is a detailed view of a B part illustrated in FIG. 24.

FIG. 24 is a time chart for describing the operations performed by the control device 2*a*. FIG. 24 indicates relationship between the peak value Ip_V of the load current Ip and the control signal transmitted by the control device 2*a*. The time t0 to t5 in FIG. 24 is an origin of the change of the load current Ip.

At the time before the time t0, all the LED lamps 3*a* installed in the room 31 are put out. When it is detected that the load opening/closing switch SW2 is turned ON at the time t0, the control device 2*a* transmits the control signal for the security (for instance, the control signal including the user code) to the LED lamp 3*a*1. Since the load opening/closing switch SW2 is turned ON, at the time t0, the load current Ip rapidly increases as indicated in A in FIG. 24.

When the push switch SW1 is pressed at the time t1, the control device 2*a* transmits the control signal for changing the illuminance to the LED lamp 3*a*1 in order to change a lighting mode. In the LED lamp 3*a*1, the control signal is received, and the illuminance is changed. At the time, in the LED lamp 3*a*1, the current consumption is gradually increased by the function of the current control means (B indicated in FIG. 24). FIG. 25 is a detail view of a B part indicated in FIG. 24. FIG. 25 indicates the case of increasing the load current by a fixed value each in every 0.1 second when changing the illuminance of the LED lamp 3*a*.

By the change of the illuminance in the LED lamp 3*a*1, the load current Ip is changed. In the control device 2*a*, by the function of the determination means, it is specified that the change is caused by the change of the illuminance of the LED lamp 3*a*. When it is specified that the illuminance of the LED lamp 3*a* is changed, the control device 2*a* does not transmit the control signal for the security such as one transmitted at the time t0 to the LED lamp 3*a*.

Also when the push switch SW1 is pressed at the time t2, the control similar to the control executed at the time t1 is executed.

When the switch SW5 is turned ON at the time t3, the LED lamp 3*a*2 is lit. At this time, in the LED lamp 3*a*2, the current consumption is rapidly increased by the function of the current control means (A indicated in FIG. 24).

By lighting of the LED lamp 3*a*2, the load current Ip is changed. In the control device 2*a*, by the function of the determination means, it is specified that the change is caused by the activation of the LED lamp 3*a*2. When it is specified that the LED lamp 3*a*2 is activated, the control device 2*a* transmits the control signal for the security (for instance, the control signal including the user code) to the LED lamp 3*a*2.

Also when the push switch SW1 is pressed at the time t4 and t5, the control similar to the control executed at the time t1 is executed.

With the control system including the above-described configuration, even when a switch capable of turning the LED lamps 3*a* ON/OFF is included other than the load opening/closing switch SW2, the corresponding control signal can be appropriately outputted when the LED lamps 3*a* are activated. In the present embodiment, only one switch SW5 is installed. It indicates the simplest example. The LED lamps 3*a* may be divided into a plurality of groups and the switch capable of turning the LED lamps 3*a* ON/OFF may be installed for each group.

In general lighting facilities, the lamps of the plurality of groups are turned ON/OFF from one switch box, or a plurality of switch boxes are installed. With the control system of the above-described configuration, such facilities can be coped with by one control device 2*a*. Especially, in an energy saving system which controls the illuminance of the LED lamps 3*a* according to a natural lighting situation, it is rational to change the lighting mode depending on weather and the time. There is no need of installing the plurality of the control devices 2*a* in the same room, and the system can be configured at a low cost.

INDUSTRIAL APPLICABILITY

The control system according to the present invention is applicable to a system in which a control device and a load are connected through a power line.

REFERENCE SIGNS LIST

1 AC power source
2 Control device

2a Control device
AC AC power source
U2 Microprocessor
ACout_h, ACout_1 AC output terminal
SSR1 Solid state relay
RY1 Mechanical relay
DB1 Diode bridge
R1, R2, R14 Resistor
SW1, SW3 Push switch
SW2 Load opening/closing switch
LD1, LD2, LD3, LD4 Light emitting diode
CN3-F, CN1_M, CN1_F Connector
P. Writer Writer
PC Computer
U4 Photocoupler
X1 Crystal vibrator
U4 Real time clock
LF1 Current transformer
C4, C5 Capacitor
U3 OP amplifier for pulse amplification
U5 Integrated circuit
2b Address setter
3 Load
3a LED lamp
ACin_h, ACin_1 AC input terminal
U8, U9 LED module
Q2, Q4 Field effect transistor (FET)
U5 Integrated circuit (IC)
U3 Infrared light receiving element
FL1 Optical filter
D2 Diode for clamping
U4 Microprocessor
R1, R2, R3, R4, R7, R8, R17 Resistor
SW4 Switch
DB2 Diode bridge
EEPM Memory
C7 Capacitor
L1 Inductor coil
D1 High-frequency switching diode
C6 Smoothing capacitor
4 Power line
5 Operative part
6 Interruption means
7 Transmission means
8 Detection means
9 Demodulation means
10 Control means
11 Demodulation means
12 Variation means
13 Transmission means
14 Power supply part
15 Operation panel part
16 Pulse detection part
17 Calendar part
18 Program input part
19 Address setting key
20 Control part
21 Resistor part
22 Socket
23 Graph preparation means
24 Date and time information output means
25 Time calculation means
26 Element calculation means
27 Storage means
28 Division setting means
29 Table preparation means
30 Switch
31 Room
32, 33 Doorway
34 Rectifier circuit

The invention claimed is:

1. A control system comprising:
a load including an operative part; and
a control device for supplying AC power to the load through a power line and operating the operative part, wherein
the control device includes first circuitry configured to:
interrupt power supply to the load; and
transmit a control signal to the load through the power line by blocking the power supply to the load for a time duration shorter than a half cycle of AC output;
the load includes second circuitry configured to control the operative part based on the control signal received from the control device;
the second circuitry is configured to transmit an information signal to the control device through the power line by generating a pair of pulsed current variations between a zero-cross point and a next zero-cross point of AC input;
a time interval between a first of the pair of pulsed current variations and a second of the pair of pulsed current variations is less than or equal to a quarter wavelength of the AC input; and
the first circuitry is configured to:
detect the current variations,
measure the interval of the current variations based on a result of detection, and
demodulate the information signal transmitted by the load.

2. The control system according to claim 1, wherein the second circuitry is configured to:
demodulate the control signal transmitted by the control device based on temporal change of an AC voltage supplied from the control device, and
control the operative part based on a result of demodulation.

3. The control system according to claim 1, wherein the first circuitry is configured to block the power supply to the load at a zero-cross point of the AC output to transmit the control signal and to restart the power supply to the load at a predetermined timing between the zero-cross point and a next zero-cross point.

4. The control system according to claim 1, wherein the first circuitry is configured to transmit the control signal of contents according to the information signal received from the load to the load by interrupting the power supply to the load based on a result of demodulation.

5. A control system comprising:
an LED lamp including an LED element; and
a control device for supplying AC power to the LED lamp through a power line and making the LED element emit light, wherein
the control device includes first circuitry configured to:
interrupt power supply to the LED lamp; and
transmit a control signal to the LED lamp through the power line by blocking the power supply to the LED lamp for a time duration shorter than a half cycle of AC output;
the LED lamp includes second circuitry configured to control illuminance of the LED element based on the control signal received from the control device;
the second circuitry is configured to transmit an information signal to the control device through the power line by generating a pair of pulsed current variations between a zero-cross point and a next zero-cross point of AC input;

a time interval between a first of the pair of pulsed current variations and a second of the pair of pulsed current variations is less than or equal to a quarter wavelength of the AC input; and the first circuitry is configured to:
- detect the current variations,
- measure the interval of the current variations based on a result of detection, and
- demodulate the information signal transmitted by the LED lamp.

6. The control system according to claim 5, wherein the second circuitry is configured to:
- measure ambient illuminance, and
- transmit the information signal based on the measured illuminance to the control device when a predetermined control signal is received from the control device.

7. The control system according to claim 6, wherein the second circuitry comprises:
- a light receiving element for receiving light of a predetermined wavelength region; and
- an optical filter for reducing light from the LED element that is received by the light receiving element.

8. The control system according to claim 6, wherein the first circuitry is configured to transmit to the LED lamp the control signal for making the LED element emit light according to the ambient illuminance by interrupting the power supply to the LED lamp based on a result of demodulation.

9. The control system according to claim 5, wherein the first circuitry comprises:
- a solid state relay for interrupting the power supply to the LED lamp; and
- a mechanical relay whose contact is connected in parallel with an output terminal of the solid state relay, and the first circuitry is configured to make the power be supplied to the LED lamp through contact of the mechanical relay when not transmitting the control signal, to open the contact of the mechanical relay, and then control opening/closing of the solid state relay to transmit the control signal when transmitting the control signal, to close the contact of the mechanical relay when the transmission of the control signal is completed, and make the power be supplied to the LED lamp through the contact.

10. The control system according to claim 5, wherein the second circuitry comprises a plurality of LED modules which include the LED element and are connected in parallel, and the second circuitry is configured to:
- detect disconnection of the LED modules based on a terminal voltage of the LED modules, and
- transmit a predetermined information signal to the control device when the disconnection is detected.

11. The control system according to claim 5, wherein the second circuitry is configured to:
- block current to the LED element when a predetermined control signal is received from the control device.

* * * * *